US010532669B2

(12) United States Patent
Kitagawa

(10) Patent No.: US 10,532,669 B2
(45) Date of Patent: Jan. 14, 2020

(54) VEHICLE SEAT

(71) Applicant: TOYOTA JIDOSHA KABUSHIKI KAISHA, Toyota-shi, Aichi-ken (JP)

(72) Inventor: Yuichi Kitagawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/130,301

(22) Filed: Sep. 13, 2018

(65) Prior Publication Data

US 2019/0106023 A1    Apr. 11, 2019

(30) Foreign Application Priority Data

Oct. 10, 2017 (JP) .................. 2017-197052

(51) Int. Cl.
    *B60N 2/16*     (2006.01)
    *B60N 2/02*     (2006.01)

(52) U.S. Cl.
    CPC .......... *B60N 2/165* (2013.01); *B60N 2/0232* (2013.01); *B60N 2002/022* (2013.01); *B60N 2002/0288* (2013.01)

(58) Field of Classification Search
    CPC ............................. B60N 2/165; B60N 2/0232
    USPC ...................................... 296/68.1; 297/216.1
    See application file for complete search history.

(56) References Cited

U.S. PATENT DOCUMENTS

| 4,652,049 A * | 3/1987 | Maruyama ............... A47C 7/14 |
| | | 297/284.11 |
| 5,340,185 A * | 8/1994 | Vollmer ............... B60N 2/4221 |
| | | 296/68.1 |
| 6,050,635 A * | 4/2000 | Pajon .................. B60N 2/4221 |
| | | 297/216.1 |
| 6,296,292 B1 * | 10/2001 | Feldman ............. B60N 2/4221 |
| | | 280/728.2 |
| 6,682,141 B2 * | 1/2004 | Reynolds ........... B60N 2/42763 |
| | | 296/68.1 |
| 7,780,235 B2 * | 8/2010 | Teufel .................. B60N 2/1853 |
| | | 297/344.15 |
| 2004/0055806 A1 | 3/2004 | Masuda et al. |
| 2009/0045614 A1 | 2/2009 | Katsuda |
| 2010/0164261 A1 | 7/2010 | Wich et al. |

(Continued)

FOREIGN PATENT DOCUMENTS

| DE | 3841688 A1 | 6/1990 |
| DE | 102004046723 A1 | 4/2006 |
| DE | 102007037985 A1 | 2/2008 |

(Continued)

*Primary Examiner* — Joseph D. Pape
(74) *Attorney, Agent, or Firm* — Oliff PLC

(57) ABSTRACT

There is provided a vehicle seat that includes: a waist movement suppressing member that is disposed at a seat front side and a seat upper side of a seat cushion, and that extends in a seat width direction; movable members that support both end portions of the waist movement suppressing member movably in a seat vertical direction; urging members that urge the movable members toward a seat upper side; raising mechanisms that, at a time of sudden braking or at a time a collision is predicted, move the waist movement suppressing member toward the seat upper side; and stoppers that limit movement, toward a seat lower side, of the waist movement suppressing member that has been moved toward the seat upper side by the raising mechanisms.

10 Claims, 15 Drawing Sheets

(56) References Cited

U.S. PATENT DOCUMENTS

2010/0270836 A1* 10/2010 Mowry .................... B60N 2/24
                                                        297/216.19

FOREIGN PATENT DOCUMENTS

| DE | 102011112259 A1 | 3/2013 |
|----|-----------------|--------|
| JP | 2001-146127 A   | 5/2001 |
| JP | 2002-240608 A   | 8/2002 |
| JP | 2002-370569 A   | 12/2002 |
| JP | 2004-034797 A   | 2/2004 |
| JP | 2009-045963 A   | 3/2009 |

* cited by examiner

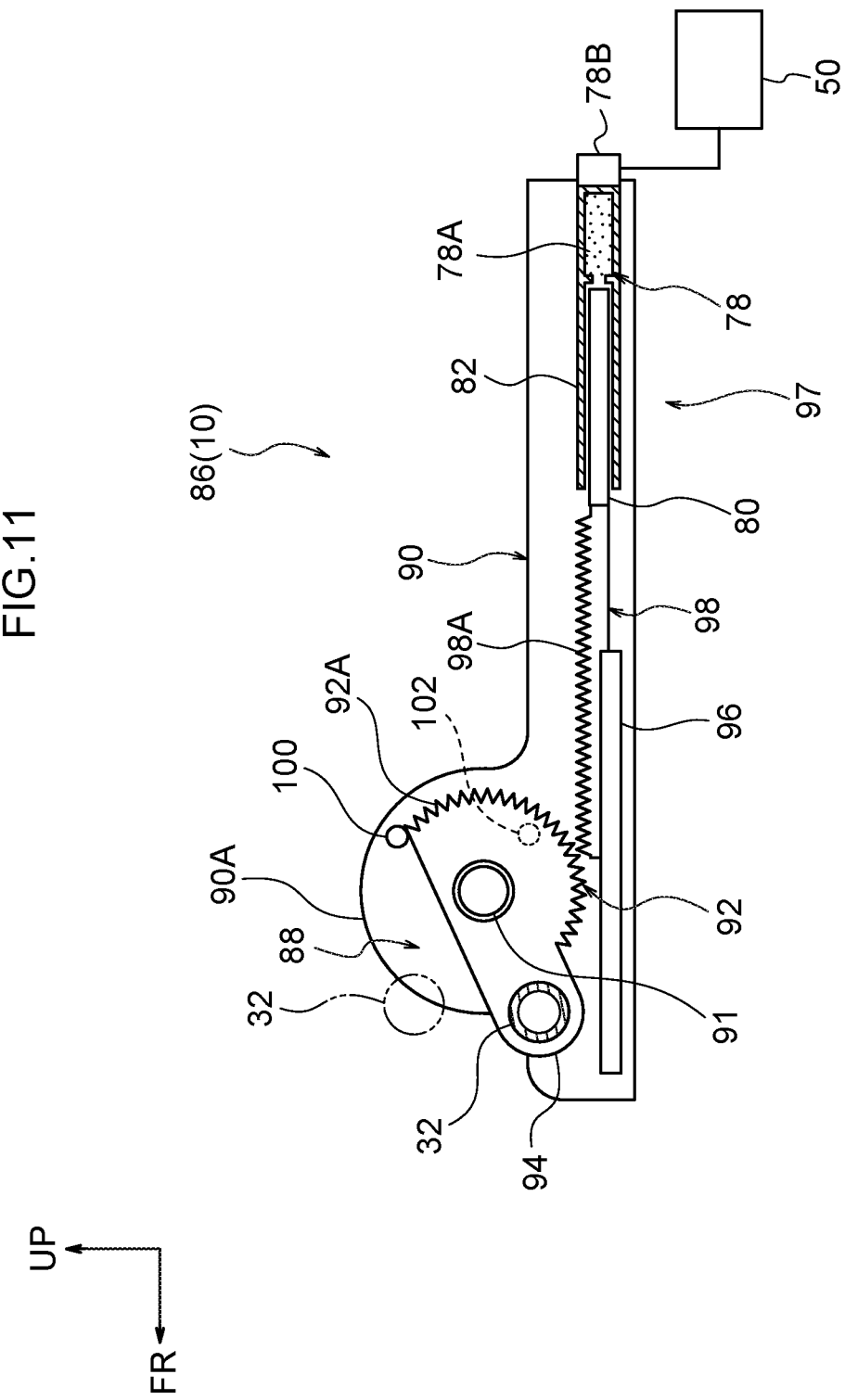

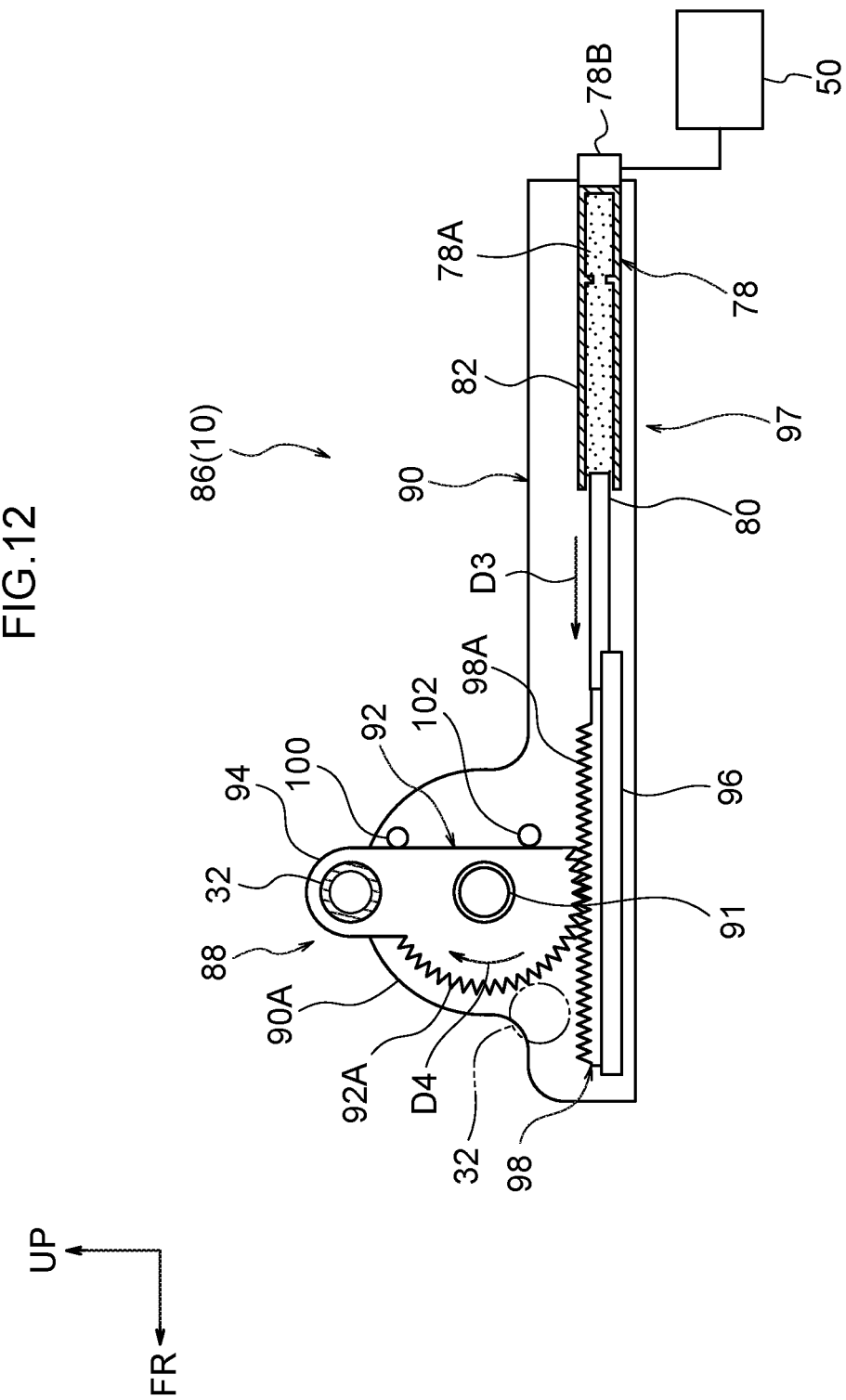

VEHICLE SEAT

CROSS-REFERENCE TO RELATED APPLICATION

This application is based on and claims priority under 35 USC 119 from Japanese Patent Application No. 2017-197052 filed on Oct. 10, 2017, the disclosure of which is incorporated by reference herein.

BACKGROUND

Technical Field

The present disclosure relates to a vehicle seat.

Related Art

Japanese Patent Application Laid-Open (JP-A) No. 2002-370569 discloses a vehicle seat in which a slide preventing bar that serves as a waist movement suppressing member is provided at the lower portion of a seat cushion. On the other hand, JP-A No. 2004-34797 discloses a structure in which a pipe for restraining, which serves as a waist movement suppressing member and extends in a seat width direction, is disposed beneath the front portion of a seat cushion, and this pipe for restraining is mounted to a freely-sliding arm.

In JP-A No. 2002-370569, due to the slide preventing bar being moved toward the seat upper side by a motive power generating device at the time of a collision of the vehicle, the seat cushion pad is thrust-up, and the submarine phenomenon is suppressed. In JP-A No. 2004-34797 as well, similarly, due to the arm being rotated and the pipe for restraining being moved toward the seat upper side, the submarine phenomenon is suppressed.

Here, in the structures disclosed in JP-A No. 2002-370569 and JP-A No. 2004-34797, due to the waist movement suppressing member being disposed at the lower portion of the seat cushion, at times of non-operation, the seating comfort is ensured without a foreign body sensation being imparted to the vehicle occupant. However, at the time of a vehicle collision, the waist movement suppressing member moves all at once from the lower portion toward the upper portion of the seat cushion, and therefore, there is room for improvement from the standpoint of decreasing the load to the vehicle occupant.

SUMMARY

In view of the above-described circumstances, the present disclosure provides a vehicle seat that, in a vehicle seat in which the submarine phenomenon is suppressed, can reduce the load to the vehicle occupant while ensuring the seating comfort.

A vehicle seat relating to a first aspect of the present disclosure includes: a waist movement suppressing member that is disposed at a seat front side and a seat upper side of a seat cushion, and that extends in a seat width direction; movable members that movably support both end portions of the waist movement suppressing member in a seat vertical direction; urging members that urge the movable members toward a seat upper side; raising mechanisms that, at a time of sudden braking or at a time a collision is predicted, move the waist movement suppressing member toward the seat upper side; and stoppers that limit movement, toward a seat lower side, of the waist movement suppressing member that has been moved toward the seat upper side by the raising mechanisms.

In the first aspect of the present disclosure, the waist movement suppressing member is disposed at the seat front side and the seat upper side of the seat cushion, and extends in the seat width direction. The both end portions of the waist movement suppressing member are supported by the movable members so as to be able to move in the seat vertical direction. The movable members are urged toward the seat upper side by urging members. Therefore, when a vehicle occupant sits in the vehicle seat, the movable members move, together with the waist movement suppressing member, toward the seat lower side against the urging forces of the urging members. Further, accompanying the surface of the seat cushion being displaced in the seat vertical direction due to vibrations at the time of traveling, the movable members move up and down together with the waist movement suppressing member. Due thereto, even though the waist movement suppressing member is disposed at the seat upper side, the comfort of the ride of the passenger need not deteriorate.

Further, at the time of sudden braking or at the time a collision is predicted, the raising mechanisms move the waist movement suppressing member toward the seat upper side. Movement, toward the seat lower side, of the waist movement suppressing member that has moved toward the seat upper side is limited by the stoppers. Due thereto, at the time of sudden braking or at the time a collision is predicted, the submarine phenomenon can be suppressed due to the seat front side of the seat cushion being pushed-up by the waist movement suppressing member that has moved toward the seat upper side. Moreover, because the waist movement suppressing member is positioned at the seat upper side of the seat cushion, the stroke over which the waist movement suppressing member is moved toward the seat upper side by the raising mechanisms is small, and the load to the vehicle occupant can be decreased.

In a vehicle seat relating to a second aspect of the present disclosure, in the first aspect, each movable member is provided within a case so as to be movable in the seat vertical direction; and each raising mechanism is structured to include a plate-shaped member that is disposed within the case further toward the seat lower side than its corresponding movable member, and an actuator that moves the plate-shaped member toward the seat upper side.

In the second aspect of the present disclosure, at a time of sudden braking or at a time a collision is predicted, the actuators operate and move the plate-shaped members toward the seat upper side. Due thereto, the plate-shaped members push the movable members toward the seat upper side within the cases, and can move the waist movement suppressing member toward the seat upper side.

In a vehicle seat relating to a third aspect of the present disclosure, in the second aspect, each stopper is structured to include a projection that is provided at an inner wall of the case so as to project-out; and the projection is configured to support the plate-shaped member that has moved toward the seat upper side, and a seat lower side surface of the projection is an inclined surface that, from a distal end side to a base side, is inclined toward the seat lower side.

In the third aspect of the present disclosure, the projections are provided at inner walls of the cases so as to project-out. The plate-shaped members, which have moved toward the seat upper side, are supported by the projections. Due thereto, the movable members and the waist movement suppressing member can be maintained by the plate-shaped members in states of being pushed-up toward the seat upper side. Further, because the seat lower side surfaces of the projections are inclined surfaces, the plate-shaped members ride-up over the projections and can move toward the seat upper side.

In a vehicle seat relating to a fourth aspect of the present disclosure, in the first aspect, each raising mechanism is structured to include a moving body that is provided so as to be movable in a seat front-rear direction, and an actuator that moves the moving body; and an inclined portion, which supports the waist movement suppressing member from the seat lower side and moves the waist movement suppressing member in the seat vertical direction accompanying movement of the moving body, is formed at the moving body.

In the fourth aspect of the present disclosure, at the time of sudden braking or at the time a collision is predicted, due to the actuators operating, the moving bodies are moved in the seat front-rear direction. Due thereto, the inclined portions of the moving bodies, which are supporting the waist movement suppressing member from the seat lower side, move in the seat front-rear direction, and can push the waist movement suppressing member up toward the seat upper side. Further, by adjusting the angle of inclination of the inclined portions, the movement of the waist movement suppressing member toward the seat upper side can be quickened or slowed.

In a vehicle seat relating to a fifth aspect of the present disclosure, in the fourth aspect, each stopper is structured to include a ledge portion that is horizontal, that is formed at an upper end of the inclined portion, and that is continuous with the inclined portion.

In the fifth aspect of the present disclosure, the waist movement suppressing member, which has been pushed-up toward the seat upper side by the inclined portions, is supported by the horizontal ledge portions. Due thereto, movement of the waist movement suppressing member toward the seat lower side can be limited.

In a vehicle seat relating to a sixth aspect of the present disclosure, in the fourth or fifth aspect, a lower end portion of the inclined portion is a curved shaped that bulges-out toward the seat lower side.

In the sixth aspect of the present disclosure, as compared with a case in which the lower end portions of the inclined portions are rectilinear, the speed in the initial stage of movement when the waist movement suppressing member moves toward the seat upper side can be reduced, and the load to the vehicle occupant becoming large can be suppressed.

In a vehicle seat relating to a seventh aspect of the present disclosure, in the first aspect, each movable member is structured to include a rotating member that is configured to rotate around a rotation shaft whose axial direction is a seat width direction; and each raising mechanism is structured to include an actuator that, by rotating the rotating member, moves the waist movement suppressing member toward the seat upper side.

In the seventh aspect of the present disclosure, at the time of sudden braking or at the time when a collision is predicted, due to the actuators operating, the rotating members are rotated and can move the waist movement suppressing member toward the seat upper side. Further, if the angle of rotation of the rotating members is adjusted, the height of the waist movement suppressing member can be changed.

In a vehicle seat relating to an eighth aspect of the present disclosure, in the seventh aspect, the actuator is structured to include an electric motor, and a motor shaft of the electric motor is connected to the rotating member, and, due to the electric motor being driven, the rotating member is rotated and the waist movement suppressing member is moved toward the seat upper side.

In the eighth aspect of the present disclosure, if the electric motors are not energized, the rotating members rotate freely. Therefore, accompanying the surface of the seat cushion being displaced in the seat vertical direction due to vibrations at the time of traveling, the waist movement suppressing member can be moved up and down. Further, at the time of sudden braking or at the time a collision is predicted, due to the electric motors being energized, the rotating members are rotated and can move the waist movement suppressing member toward the seat upper side.

In a vehicle seat relating to a ninth aspect of the present disclosure, in the seventh or eighth aspect, each stopper is provided so as to be movable in a seat width direction from a non-anchoring position, at which the stopper does not overlap the rotating member as seen from a seat front-rear direction, to an anchoring position, at which the stopper overlaps the rotating member as seen from the seat front-rear direction; and in a state in which the waist movement suppressing member is moved toward the seat upper side by the actuator, the stopper moves to the anchoring position and limits rotation of the rotating member.

In the ninth aspect of the present disclosure, rotation of the rotating members is locked due to the stoppers moving from the non-anchoring positions to the anchoring positions in the state in which the waist movement suppressing member is moved toward the seat upper side. Due thereto, movement of the waist movement suppressing member toward the seat lower side can be limited.

In the vehicle seat relating to a tenth aspect of the present disclosure, any one of the first through ninth aspects further includes a returning mechanism that moves the waist movement suppressing member, that has been moved toward the seat upper side, toward the seat lower side again.

In the tenth aspect of the present disclosure, due to the waist movement suppressing member being moved toward the seat lower side by the returning mechanisms in a case in which a collision is avoided or the like, the state in which the seat front side of the seat cushion is pushed-up can be cancelled.

As described above, in accordance with the vehicle seat relating to the first aspect of the present disclosure, there is the excellent effect that, in a vehicle seat at which the submarine phenomenon is suppressed, load to the vehicle occupant can be reduced while the seating comfort is ensured.

In accordance with the vehicle seat relating to the second aspect of the present disclosure, there is the excellent effect that the waist movement suppressing member can be moved toward the seat upper side by a simple structure.

In accordance with the vehicle seat relating to the third aspect of the present disclosure, there is the excellent effect that movement of the waist movement suppressing member toward the seat lower side can be limited by a simple structure.

In accordance with the vehicle seat relating to the fourth aspect of the present disclosure, there is the excellent effect that the moving speed of the waist movement suppressing member can be easily changed merely by adjusting the angle of inclination of the inclined portions.

In accordance with the vehicle seat relating to the fifth aspect of the present disclosure, there is the excellent effect that movement of the waist movement suppressing member toward the seat lower side can be limited reliably.

In accordance with the vehicle seat relating to the sixth aspect of the present disclosure there is the excellent effect that load to the vehicle occupant can be reduced easily.

In accordance with the vehicle seat relating to the seventh aspect of the present disclosure, there is the excellent effect that the height of the waist movement suppressing member can be adjusted easily.

In accordance with the vehicle seat relating to the eighth aspect of the present disclosure, there is the excellent effect that the rotating members can be rotated by a simple structure.

In accordance with the vehicle seat relating to the ninth aspect of the present disclosure, there is the excellent effect that rotation of the rotating members can be locked by a simple structure.

In accordance with the vehicle seat relating to the tenth aspect of the present disclosure, there is the excellent effect that the waist movement suppressing member can be returned to its original position at a time when a collision is avoided or the like.

BRIEF DESCRIPTION OF THE DRAWINGS

Exemplary embodiments of the present disclosure will be described in detail based on the following figures, wherein:

FIG. 11 is an enlarged sectional view that shows, in an enlarged manner, the vehicle occupant movement suppressing device that is a main portion of the vehicle seat relating to the third embodiment, and is a drawing showing a state in which a vehicle occupant is seated in the vehicle seat;

FIG. 12 is an enlarged sectional view that shows, in an enlarged manner, the vehicle occupant movement suppressing device that is a main portion of the vehicle seat relating to the third embodiment, and is a drawing showing a state in which an inflator has operated;

DETAILED DESCRIPTION

First Embodiment

A vehicle seat 10 relating to a first embodiment of the present disclosure is described hereinafter by using FIG. 1 through FIG. 5B. Note that arrow FR that is shown appropriately in the respective drawings indicates the vehicle forward direction, arrow UP indicates the vehicle upward direction, and arrow LH indicates the vehicle leftward direction. Hereinafter, when description is given by using longitudinal, left-right, and vertical directions, they refer to the longitudinal of the vehicle longitudinal direction, the left and right of the vehicle left-right direction (the vehicle transverse direction), and the vertical of the vehicle vertical direction, unless otherwise indicated.

(Overall Structure of Vehicle Seat)

Figure 1:
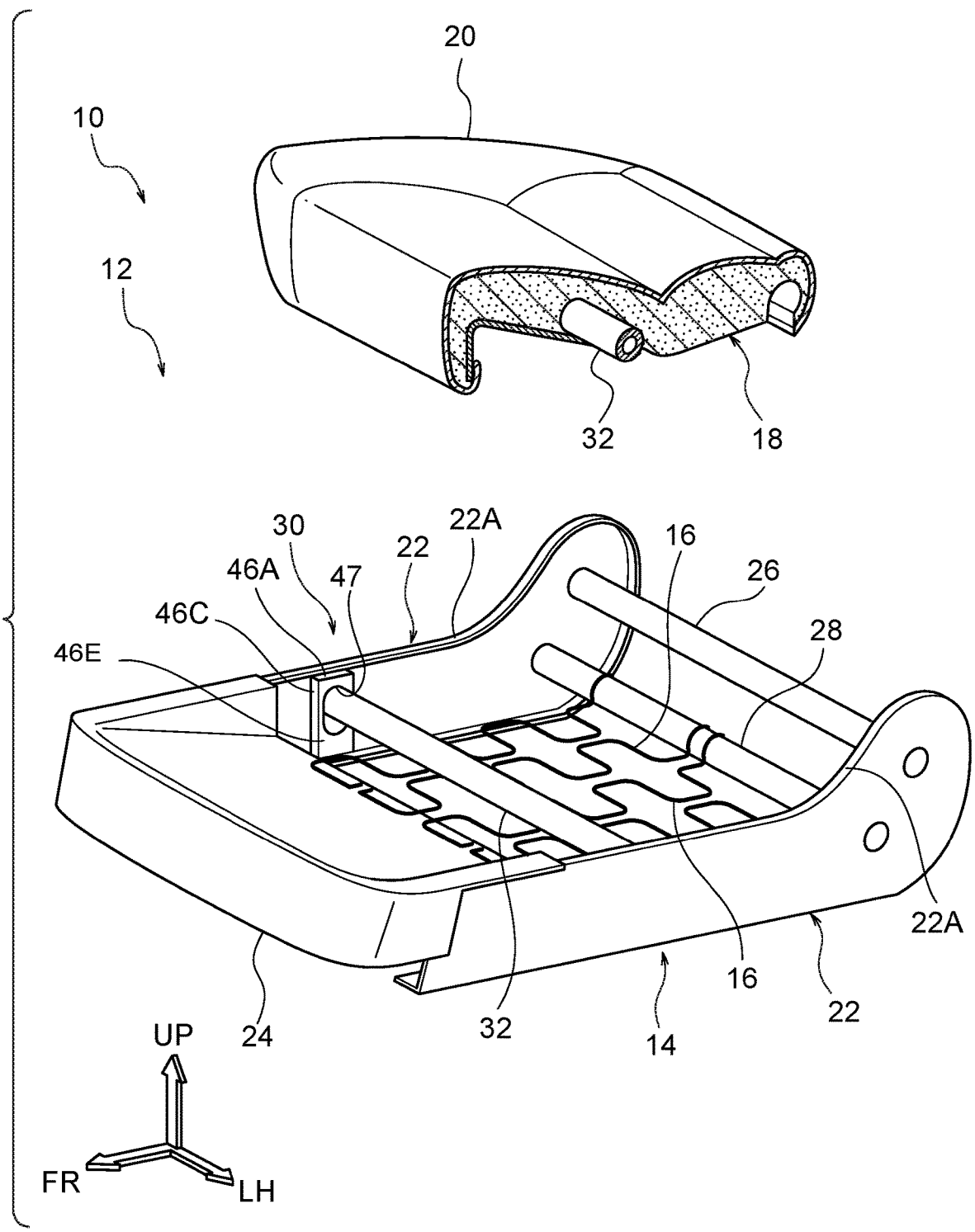
FIG. 1 is an exploded perspective view of a seat cushion that structures a vehicle seat relating to a first embodiment.

As shown in FIG. 1, the vehicle seat 10 relating to the present embodiment has a seat cushion 12. The buttocks and thigh regions of a vehicle occupant P (see FIG. 4) who is seated in the vehicle seat 10 are supported by this seat cushion. The lower end portion of an unillustrated seatback is connected to the rear end portion of the seat cushion 12, and the back portion of the vehicle occupant P is supported by the seatback. Note that, in the present embodiment, the longitudinal direction, the left-right direction (transverse direction) and the vertical direction of the vehicle seat 10 coincide with the longitudinal, left-right and vertical directions of the vehicle in which the vehicle seat 10 is installed.

The seat cushion 12 has a seat cushion frame 14 that is a frame member, plural seat cushion springs 16 that are mounted to the seat cushion frame 14, a seat cushion pad 18 that is supported by the seat cushion frame 14 and the seat cushion springs 16, and a seat cushion skin 20 that covers the surface of the seat cushion pad 18.

The seat cushion frame 14 has a pair of left and right side frames 22 that extend in the seat front-rear direction at the left and right side portions of the seat cushion 12, a front frame 24 that spans between the upper portions of the front portions of the left and right side frames 22, and a pair of upper and lower rear frames 26, 28 that span between the rear end portions of the left and right side frames 22.

The left and right side frames 22 are formed in elongated shapes and of metal plates for example, and are disposed such that the length directions thereof are the vehicle longitudinal direction and the thickness directions thereof are the vehicle transverse direction. Flange portions 22A that project-out toward the seat width direction inner side are formed at the regions of the peripheral edge portions of the left and right side frames 22, except for the front edge portions thereof. These side frames 22 are connected to the floor portion of the vehicle body via an unillustrated seat sliding mechanism.

The front frame 24 is formed in an elongated shape and of a metal plate for example, and is disposed such that the length direction thereof is the vehicle transverse direction. The front frame 24 is fixed to the front portions of the left and right side frames 22 by means such as welding or the like. The upper and lower rear frames 26, 28 are formed by pipes made of metal for example, and are disposed in postures such that the axial directions thereof run along the vehicle transverse direction. The vehicle transverse direction both end portions of the upper and lower rear frames 26, 28 are fixed to the rear end portions of the left and right side frames 22 by means such as caulking or the like.

The plural seat cushion springs 16 are so-called S-springs, and are disposed so as to be lined-up in the seat width direction between the left and right side frames 22. These seat cushion springs 16 span between the front frame 24 and the rear frame 28 that is at the lower side. The seat cushion pad 18 is structured by a foamed body of urethane foam or the like for example, and is mounted to the seat cushion frame 14 from the upper side. The seat cushion skin 20 is manufactured by sewing together plural skin pieces that are formed from cloth, leather, synthetic leather or the like for example, and is covered on the seat cushion pad 18 from the upper side. The seat cushion skin 20 structures the surface (the upper surface) of the seat cushion 12.

Here, a vehicle occupant movement suppressing device 30, which is for suppressing movement of the vehicle occupant P toward the seat front side at the time of a front collision of the vehicle, is provided at the seat cushion 12. Details of the vehicle occupant movement suppressing device 30 are described hereinafter.

(Vehicle Occupant Movement Suppressing Device)

Figure 2:
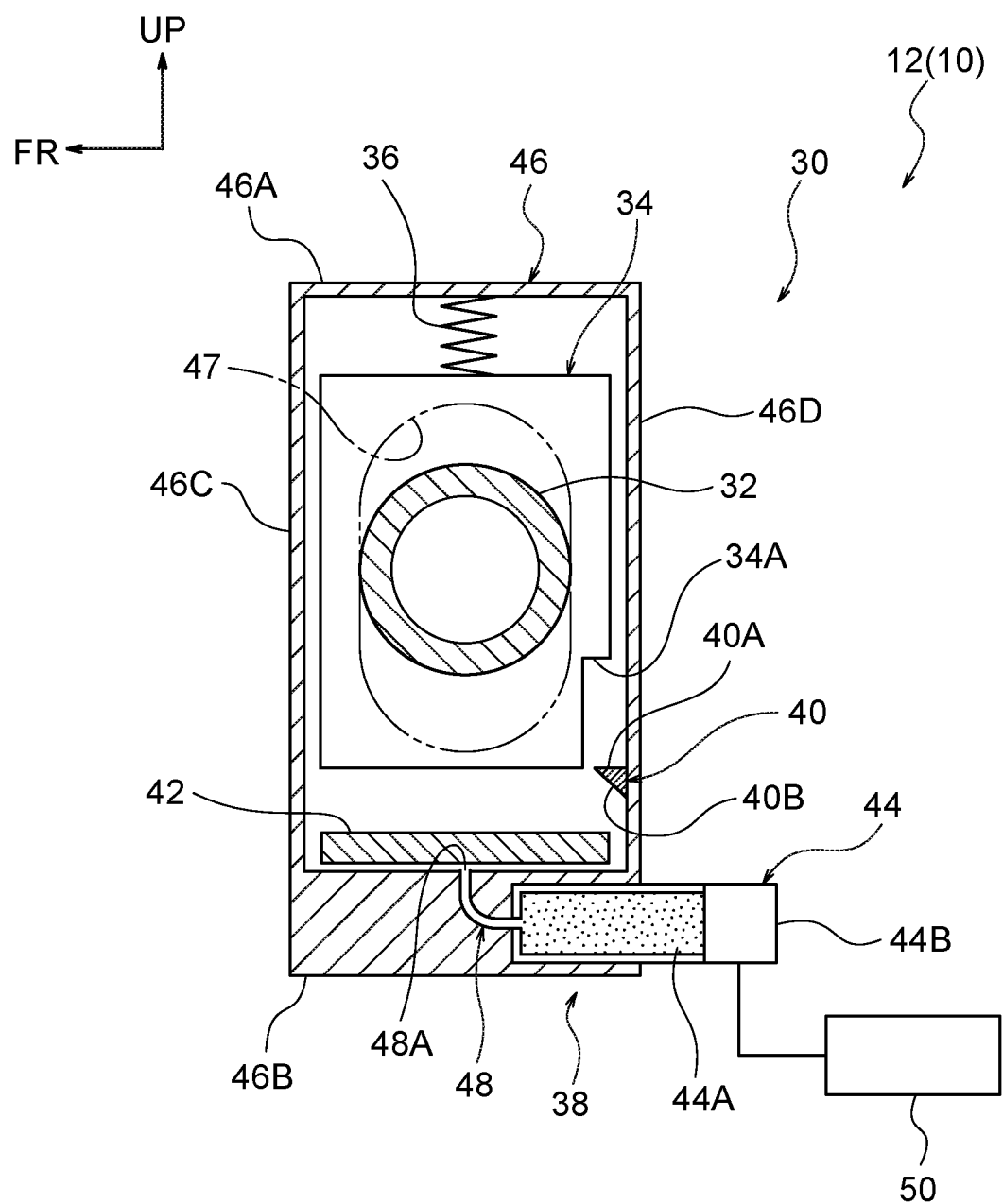
FIG. 2 is an enlarged side sectional view that shows, in an enlarged manner, a vehicle occupant movement suppressing device that is a main portion of the vehicle seat relating to the first embodiment, and is a drawing showing a state in which a vehicle occupant is seated in the vehicle seat.

As shown in FIG. 2, the vehicle occupant movement suppressing device 30 is structured to include a waist movement suppressing member 32, movable members 34, tension springs 36 that serve as urging members, raising mechanisms 38, and projections 40 that serve as stoppers. The raising mechanism 38 is structured to include a plate-shaped member 42 and an inflator 44 that serves as an actuator.

As shown in FIG. 1, the waist movement suppressing member 32 is disposed at the seat front side and the seat upper side of the seat cushion 12, and is formed by a metal pipe that extends in the seat width direction. The waist movement suppressing member 32 passes-through the seat cushion pad 18. Note that, in FIG. 1, a portion of the waist movement suppressing member 32 is illustrated at the seat cushion pad 18 side as well for convenience of explanation.

The seat width direction both end portions of the waist movement suppressing member 32 are connected to the movable members 34. Note that the one end side and the other end side of the waist movement suppressing member 32 are structures that are symmetrical to the left and the right, and therefore, in the following description, the structure of the portion of the vehicle occupant movement suppressing device 30 that is at the right side of the seat is illustrated and explained as an example.

As shown in FIG. 2, the movable member 34 is formed in a substantially rectangular shape as seen in a side view, and is accommodated within a case 46 that is described later. The waist movement suppressing member 32 is connected to the seat width direction inner side surface of the movable member 34, and the waist movement suppressing member 32 is supported by the movable member 34.

The case 46 is provided at the side frame 22 (see FIG. 1) that structures the seat cushion frame 14, and is formed in the shape of a box that is substantially rectangular as seen from the side. Concretely, the case 46 is structured to include an upper wall 46A, a lower wall 46B, a front wall 46C and a rear wall 46D. Further, the seat width direction inner side end portion of the front wall 46C and the seat width direction inner side end portion of the rear wall 46D are connected in the longitudinal direction by an inner side wall 46E. A guide hole 47 is formed in this inner side wall 46E (see FIG. 1). Moreover, the seat width direction outer side end portion of the front wall 46C and the seat width direction outer side end portion of the rear wall 46D are connected in the longitudinal direction by an unillustrated outer side wall. This outer side wall is mounted to the side frame 22 (see FIG. 1).

Here, the movable member 34 is disposed at the interior of the case 46, and gaps are provided between the movable member 34, and the front wall 46C and the rear wall 46D of the case 46. A cut-out portion 34A that is a shape in which a corner portion is cut-out is formed in the seat rear end and the seat lower end of the movable member 34. This cut-out portion 34A is a relief portion for avoiding interference with the projection 40 that is described later.

One end portion (the upper end portion) of the tension spring 36 is connected to the upper wall 46A of the case 46, and the other end portion (the lower end portion) of the tension spring 36 is mounted to the top surface of the movable member 34. Due thereto, the movable member 34 is urged toward the seat upper side by the tension spring 36.

Here, the guide hole 47 that is formed in the case 46 is formed in an elliptical shape whose length direction is the seat vertical direction. The waist movement suppressing member 32 is inserted-through the guide hole 47. Therefore, the waist movement suppressing member 32 can move in the seat vertical direction in a range between the upper edge and the lower edge of this guide hole 47. Further, in the state before the vehicle occupant P (see FIG. 4) sits, the waist movement suppressing member 32 of the present embodiment is maintained in a state of contacting the upper edge of the guide hole 47 by the tensile force of the tension spring 36.

In this state, in a case in which the vehicle occupant P sits in the vehicle seat 10 for example, the seat cushion pad 18 is pushed toward the seat lower side, and load toward the seat lower side is applied to the waist movement suppressing member 32. Due thereto, the movable member 34 moves, together with the waist movement suppressing member 32, toward the seat lower side against the urging force of the tension spring 36, and moves to the position shown in FIG. 2.

On the other hand, the raising mechanism 38 is structured to include the plate-shaped member 42 and the inflator 44 as described above. The plate-shaped member 42 is a rectangular, plate-shaped member whose plate thickness direction is the seat vertical direction, and is disposed within the case 46 further toward the seat lower side than the movable member 34. In the present embodiment, in the usual state before the inflator 44 operates, the plate-shaped member 42 is disposed on the lower wall 46B of the case 46. The length of the plate-shaped member 42 in the seat front-rear direction is a length that is substantially the same as the length of the movable member 34 in the seat front-rear direction. Gaps are provided between the plate-shaped member 42, and the front wall 46C and the rear wall 46D of the case 46.

The inflator 44 is disposed further toward the seat lower side than the plate-shaped member 42. The inflator 44 is a so-called cylinder-type inflator, and is mounted to the lower portion of the case 46 with the length direction thereof being the seat front-rear direction. The inflator 44 is structured to include a gas generating portion 44A and an igniting portion (igniter) 44B. When igniting is carried out at the igniting portion 44B on the basis of a signal from an ECU (Electronic Control Unit) 50 that is described later, gas is generated from the gas generating portion 44A. Here, one end portion of a gas flow path 48 is connected to the front end portion of the inflator 44. The other end portion of the gas flow path 48 is connected through an opening portion 48A to the space at the interior of the case 46. In the usual state, the opening portion 48A is closed-off by the plate-shaped member 42.

The ECU 50 is electrically connected to the inflator 44. A sensor that senses deceleration (deceleration G), a sensor that predicts a collision of the vehicle, and the like are electrically connected to the ECU 50. On the basis of signals from these sensors, the ECU 50 operates the inflator 44 at the time of sudden braking or at the time a collision is predicted.

The projection 40 projects-out at the rear wall (inner wall) 46D of the case 46. In the usual state before the inflator 44 operates, the projection 40 is provided at a position between the movable member 34 and the plate-shaped member 42. The surface at the seat upper side of the projection 40 is a horizontal surface 40A that is substantially horizontal. The surface at the seat lower side of the projection 40 is an inclined surface 40B that is inclined toward the seat lower side, from the distal end side toward the base side thereof.

The vehicle occupant movement suppressing device 30 is structured in this way. When the inflator 44 is operated by the ECU 50 at the time of sudden braking or at the time a collision is predicted, gas is generated from the gas generating portion 44A and flows through the gas flow path 48 and pushes-up the plate-shaped member 42, which closes-off the opening portion 48A, and flows into the space at the interior of the case 46. The plate-shaped member 42 moves toward the seat upper side due to the gas pressure, and pushes the movable member 34 up toward the seat upper side. At this time, because the surface of the projection 40 at the seat lower side is the inclined surface 40B, the plate-shaped member 42 does not anchor on the projection 40, and rides-up over the projection 40 and can move toward the seat upper side.

Figure 3:
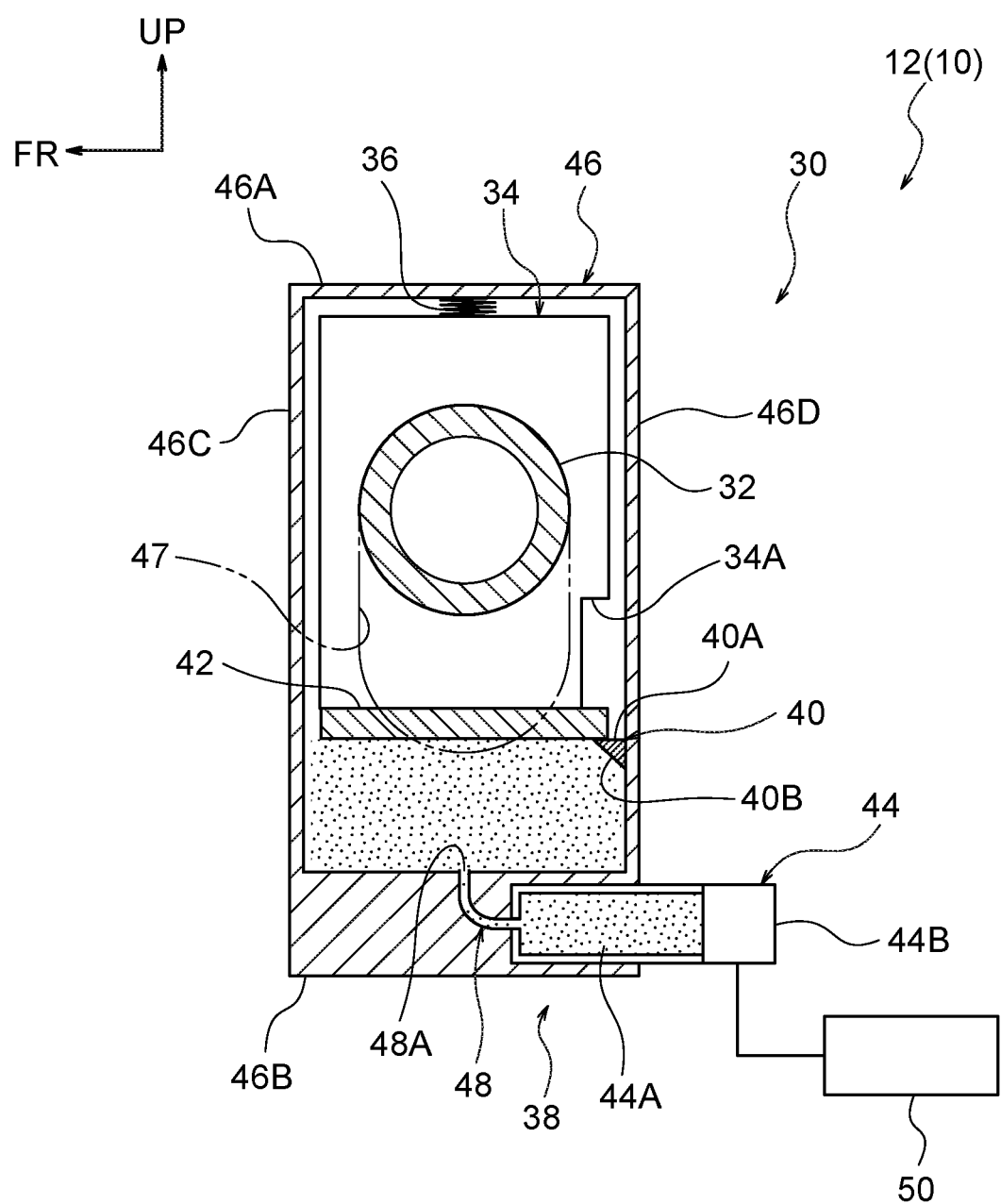
FIG. 3 is an enlarged side sectional view that shows, in an enlarged manner, the vehicle occupant movement suppressing device that is a main portion of the vehicle seat relating to the first embodiment, and is a drawing showing a state in which an inflator has operated.

As shown in FIG. 3, the plate-shaped member 42 that has ridden-up over the projection 40 anchors on the horizontal surface 40A that is at the seat upper side of the projection 40. In this way, movement of the movable member 34 toward the seat lower side is limited by the projection 40. Note that, in the present embodiment, the projection 40 is provided at a position at which it can maintain the state in which the waist movement suppressing member 32 abuts the upper edge of the guide hole 47. Further, in the present embodiment, because the projection 40 is formed only at the rear wall 46D of the case 46, there are cases in which the front end side of the plate-shaped member 42 drops and the movable member 34 tilts slightly. Even in such a case, because the gaps between the movable member 34 and the inner walls (the front wall 46C, the rear wall 46D) of the case 46 are narrow, the movable member 34 that has tilted catches on the inner walls of the case 46, and the position of the waist movement suppressing member 32 is maintained.

(Operation and Effects)

Operation and effects of the present embodiment are described next.

In the vehicle seat 10 of the present embodiment, as shown in FIG. 2, the both end portions of the waist movement suppressing member 32 are supported by the movable members 34 so as to be able to move in the seat vertical direction. The movable members 34 are urged by the tension springs 36 toward the seat upper side. Therefore, when the vehicle occupant P (see FIG. 4) sits in the vehicle seat 10, the movable members 34 move, together with the waist movement suppressing member 32, toward the seat lower side against the urging forces of the tension springs 36. Further, accompanying the surface of the seat cushion 12 being displaced in the seat vertical direction due to vibrations at the time of traveling, the movable members 34 move up and down together with the waist movement suppressing member 32. Due thereto, even though the waist movement suppressing member 32 is disposed at the seat upper side, the comfort of the ride of the vehicle occupant P need not deteriorate.

Further, at the time of sudden braking or at the time when a collision is predicted, due to the inflators 44 operating, the waist movement suppressing member 32 is moved toward the seat upper side to a position that is higher than at least that at the time when the vehicle occupant P sits in the seat. Further, movement, toward the seat lower side, of the waist movement suppressing member 32 that has moved toward the seat upper side is limited by the projections 34. Due thereto, as shown in FIG. 3, at the time of sudden braking or at the time a collision is predicted, the waist movement suppressing member 32 moves toward the seat upper side and pushes the seat front side of the seat cushion 12 upward, and the submarine phenomenon can be suppressed.

Moreover, because the waist movement suppressing member 32 is positioned at the seat upper side of the seat cushion 12, the stroke over which the waist movement suppressing member 32 moves toward the seat upper side at the time when the vehicle occupant movement suppressing device 30 operates is small, and the load to the vehicle occupant P can be reduced. This point will be explained by comparison with a comparative example.

Figure 4:
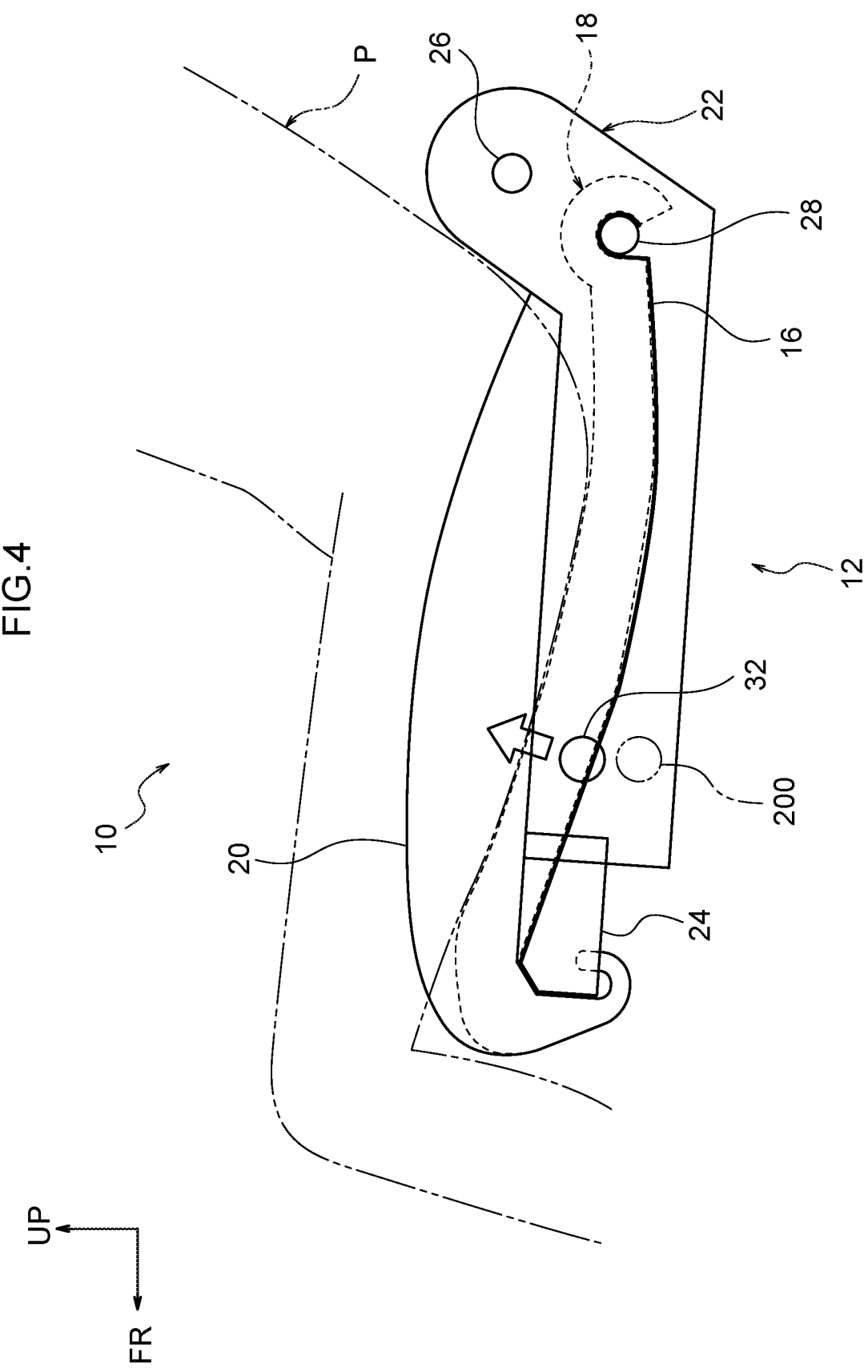
FIG. 4 is a schematic side view that schematically shows the vehicle occupant movement suppressing device that is a main portion of the vehicle seat relating to the first embodiment, and is a drawing showing a state in which the vehicle occupant is seated in the vehicle seat.

As shown in FIG. 4, a waist movement suppressing member 200 of a comparative example is disposed further toward the seat lower side than the waist movement suppressing member 32 of the present embodiment, and, in a usual state, is fixed to the side frames 22. Namely, in the comparative example, the waist movement suppressing member 200 does not move in the seat vertical direction when the vehicle occupant P sits or when the vehicle travels, and therefore, is disposed further toward the seat lower side than the waist movement suppressing member 32 so that the vehicle occupant P does not feel a foreign body sensation.

Figure 5A:
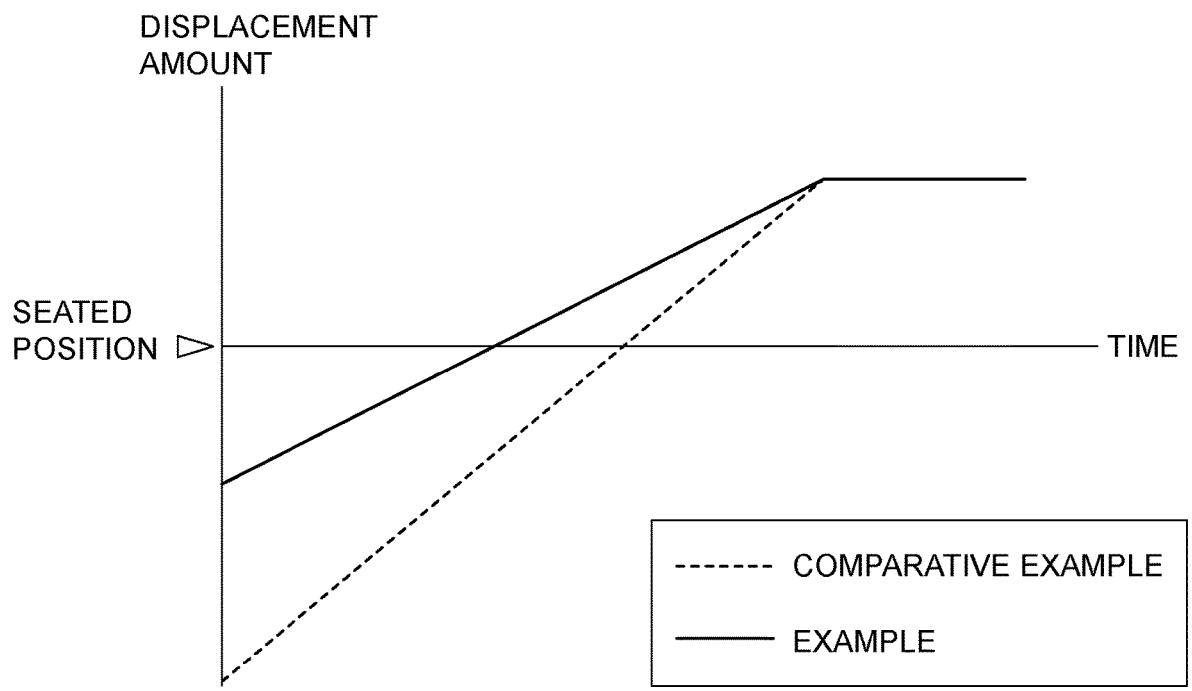
FIG. 5A is a graph that compares an example and a comparative example, and illustrates the relationship between a displacement amount of a waist movement suppressing member and time.

As shown in FIG. 5A, in the case of the structure of the comparative example to which the waist movement suppressing member 200 is applied, at the point in time immediately after the inflators 44 operate, the waist movement suppressing member 200 is disposed further toward the seat lower side than the waist movement suppressing member 32, and therefore, more time is needed than in the present embodiment until the waist movement suppressing member 200 moves to a predetermined position.

Figure 5B:
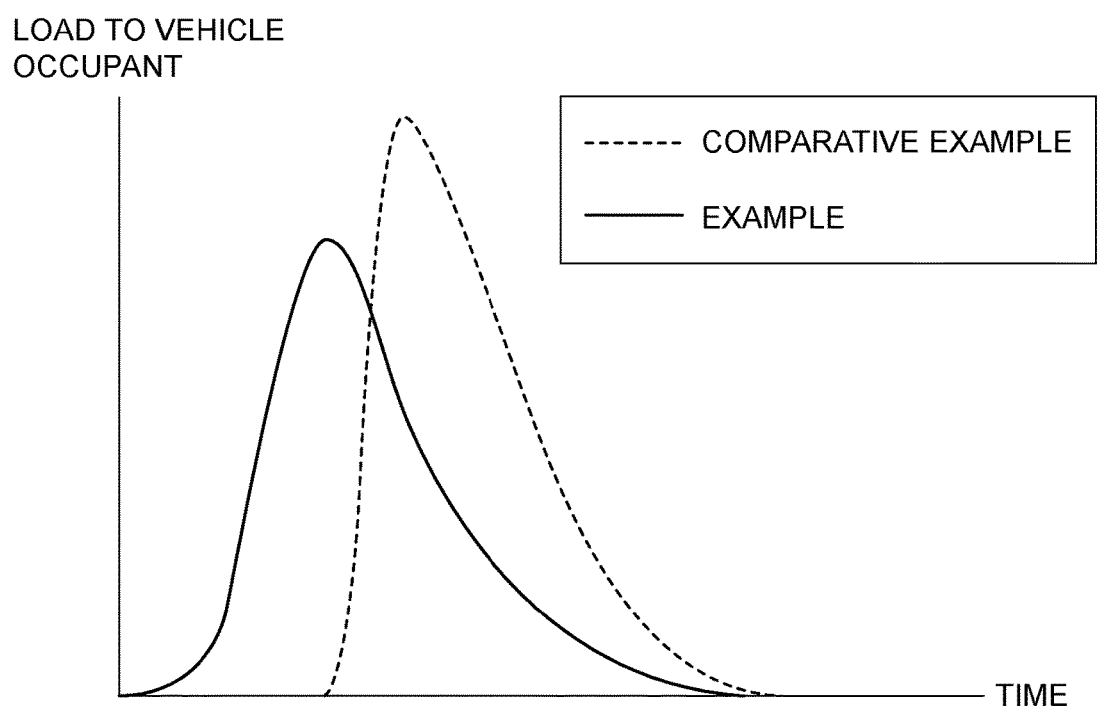
FIG. 5B is a graph that compares the example and the comparative example, and illustrates the relationship between load to the vehicle occupant and time.

Further, as shown in FIG. 5B, in the structure of the comparative example, the initial position of the waist movement suppressing member 200 is a low position. Therefore, the speed is greater by an amount corresponding to the amount that the stroke, until the waist movement suppressing member 200 moves to the predetermined position, is longer, and the load to the vehicle occupant P is large.

In contrast, in the present embodiment, as shown in FIG. 5A, the position of the waist movement suppressing member 32 is disposed at a position that is nearer to the seated position than in the comparative example, and therefore, a short time until the waist movement suppressing member 32 moves to the predetermined position is sufficient. Further, as shown in FIG. 5B, in the present embodiment, the stroke until the waist movement suppressing member 32 moves to the predetermined position is shorter than in the comparative example, and therefore, the load to the vehicle occupant P can be reduced.

Further, in the present embodiment, as shown in FIG. 2, because the movable member 34 is disposed at the interior of the case 46, when the movable member 34 is moved toward the seat upper side, the inner walls of the case 46 can be made to function as guides for the movable member 34.

Moreover, in the present embodiment, as shown in FIG. 3, movement of the movable member 34 toward the seat lower side is limited by the projection 40 that is provided at the rear wall 46D of the case 46 so as to project-out. In this way, movement of the waist movement suppressing member 32 toward the seat lower side can be limited by a simple structure.

Second Embodiment

A second embodiment of the present disclosure is described next with reference to FIGS. 6 and 7. Note that structures and operations that are basically similar to those of the first embodiment are denoted by the same reference numerals as in the first embodiment, and description thereof is omitted as appropriate.

Figure 6:
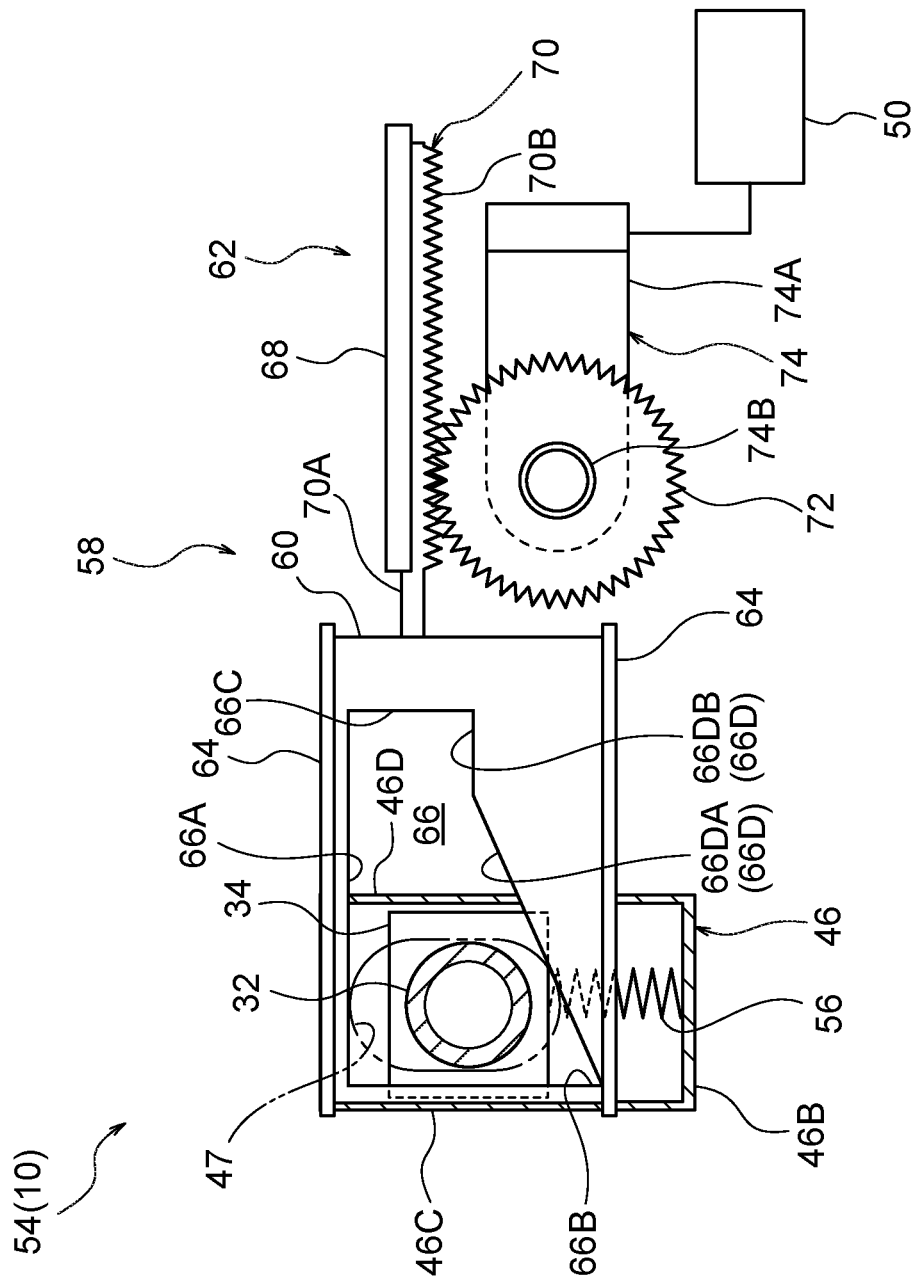
FIG. 6 is an enlarged sectional view that shows, in an enlarged manner, a vehicle occupant movement suppressing device that is a main portion of a vehicle seat relating to a second embodiment, and is a drawing showing a state in which a vehicle occupant is seated in the vehicle seat.

As shown in FIG. 6, in the same way as in the first embodiment, a vehicle occupant movement suppressing device 54 that is provided at the vehicle seat 10 relating to the present embodiment has the waist movement suppressing member 32 and the movable members 34, and the movable members 34 are disposed at the interiors of the cases 46. The case 46 is a structure that is similar to that of the first embodiment, except for the point that the case 46 does not have the inflator 44 and the gas flow path 48. The guide hole 47 is formed in the inner side wall of the case 46. Note that the case 46 is shown in cross-section in FIG. 6 and FIG. 7 for convenience of explanation. Further, the cut-out portion 34A is not formed in the movable member 34 of the present embodiment, and the movable member 34 is a shape whose length in the seat vertical direction is shorter than in the first embodiment.

A compression spring 56 that serves as an urging member is provided within the case 46. One end portion (the lower end portion) of the compression spring 56 is connected to the lower wall 46B of the case 46, and the other end portion (the upper end portion) of the compression spring 56 is mounted to the bottom surface of the movable member 34. In this way, the movable member 34 is urged toward the seat upper side by the compression spring 56. In the state before the vehicle occupant P (see FIG. 4) sits, the waist movement suppressing member 32 of the present embodiment is maintained in a state of contacting the upper edge of the guide hole 47 by the urging force of the compression spring 56.

Further, the vehicle occupant movement suppressing device 54 of the present embodiment has a push-up device 58 that serves as a raising mechanism. This push-up device 58 is structured to include a moving body 60 and an actuator 62. The moving body 60 is structured by a plate member that is substantially rectangular as seen in side view. A pair of guides 64 whose length directions are the seat front-rear direction are disposed at the top and bottom of the moving body 60. The guides 64 are respectively fixed to the side frame 22 (see FIG. 1), and the moving body 60 is mounted so as to be movable in the seat front-rear direction with respect to the guides 64. Note that FIG. 6 illustrates a state in which the moving body 60 is positioned furthest toward the seat rear side, and FIG. 7 illustrates a state in which the moving body 60 is positioned furthest toward the seat front side.

Here, a through-hole 66 is formed in the moving body 60. The through-hole 66 is formed so as to pass-through the moving body 60 in the thickness direction (the seat width direction). An upper edge 66A of the through-hole 66 extends substantially horizontally, parallel to the upper end of the moving body 60. A front edge 66B that is at the seat front side and a rear edge 66C that is at the seat rear side of the through-hole 66 are formed parallel to the front end and the rear end of the moving body 60, and extend substantially orthogonally to the upper edge 66A.

A lower edge 66D of the through-hole 66 includes an inclined portion 66DA and a ledge portion 66DB that serves as a stopper. The inclined portion 66DA structures the seat front side of the lower edge 66D, and is inclined toward the seat upper side while heading from the front edge 66B toward the rear edge 66C. Further, the inclined portion 66DA is formed to slightly further toward the seat rear side than the seat front-rear direction central portion of the moving body 60. The ledge portion 66DB is formed in continuation from the rear end portion (the upper end portion) of the inclined portion 66DA. The ledge portion 66DB is formed to the rear edge 66C, substantially horizontally and parallel to the upper edge 66A of the through-hole 66.

The rear end portion of the moving body 60 is connected to the actuator 62. The actuator 62 is structured to include a rail 68, a rack gear 70, a pinion gear 72, and an electric motor 74. The rail 68 extends in the seat front-rear direction, and is fixed to the side frame 22 (see FIG. 1). The rack gear 70 is slidably mounted to the rail 68.

The rack gear 70 is structured to include a main body portion 70A and a gear portion 70B. The main body portion 70A is slidably mounted to the rail 68. The front end portion of the main body portion 70A is connected to the moving body 60. The gear portion 70B is provided at the lower surface side of the main body portion 70A, except for at the front end portion thereof.

The pinion gear 72 is disposed beneath the rack gear 70, and is formed in a substantially circular shape as seen in a side view. The outer peripheral end portion of the pinion gear 72 meshes-together with the gear portion 70B of the rack gear 70. Due to the pinion gear 72 rotating, the rack gear 70 moves in the seat front-rear direction.

Here, the pinion gear 72 is mounted to the electric motor 74. The electric motor 74 is structured to include a housing 74A and a motor shaft 74B. The motor shaft 74B projects-out toward the seat width direction inner side from the housing 74A. The pinion gear 72 is mounted to the motor shaft 74B. Further, the electric motor 74 is electrically connected to the ECU 50. A sensor that senses deceleration (deceleration G), a sensor that predicts a collision of the vehicle, and the like are electrically connected to the ECU 50. The ECU 50 is structured so as to, on the basis of signals from these sensors, drive the electric motor 74 and rotate the pinion gear 72 counterclockwise in the drawing, at a time of sudden braking or at a time when a collision is predicted.

(Operation and Effects)

Operation and effects of the present embodiment are described next.

In the vehicle seat 10 of the present embodiment, in the usual state before the vehicle occupant movement suppressing device 54 operates, the moving body 60 is positioned furthest toward the seat rear side as shown in FIG. 6. In this state, the size (the length) of the through-hole 66 of the moving body 60 in the vertical direction is the same as the size (the length) of the guide hole 47 in the vertical direction, or is greater (longer) than the size (the length) of the guide hole 47 in the vertical direction. Therefore, the waist movement suppressing member 32 does not contact the moving body 60 even if the waist movement suppressing member 32 moves up and down along the guide hole 47. Here, when the vehicle occupant P (see FIG. 4) sits in the vehicle seat 10, the movable members 34 move, together with the waist movement suppressing member 32, toward the seat lower side against the urging forces of the compression springs 56. Further, the movable members 34 move up and down together with the waist movement suppressing member 32 due to vibrations at the time of traveling. Due thereto, even though the waist movement suppressing member 32 is disposed at the seat upper side, the comfort of the ride of the vehicle occupant P need not deteriorate.

Figure 7:
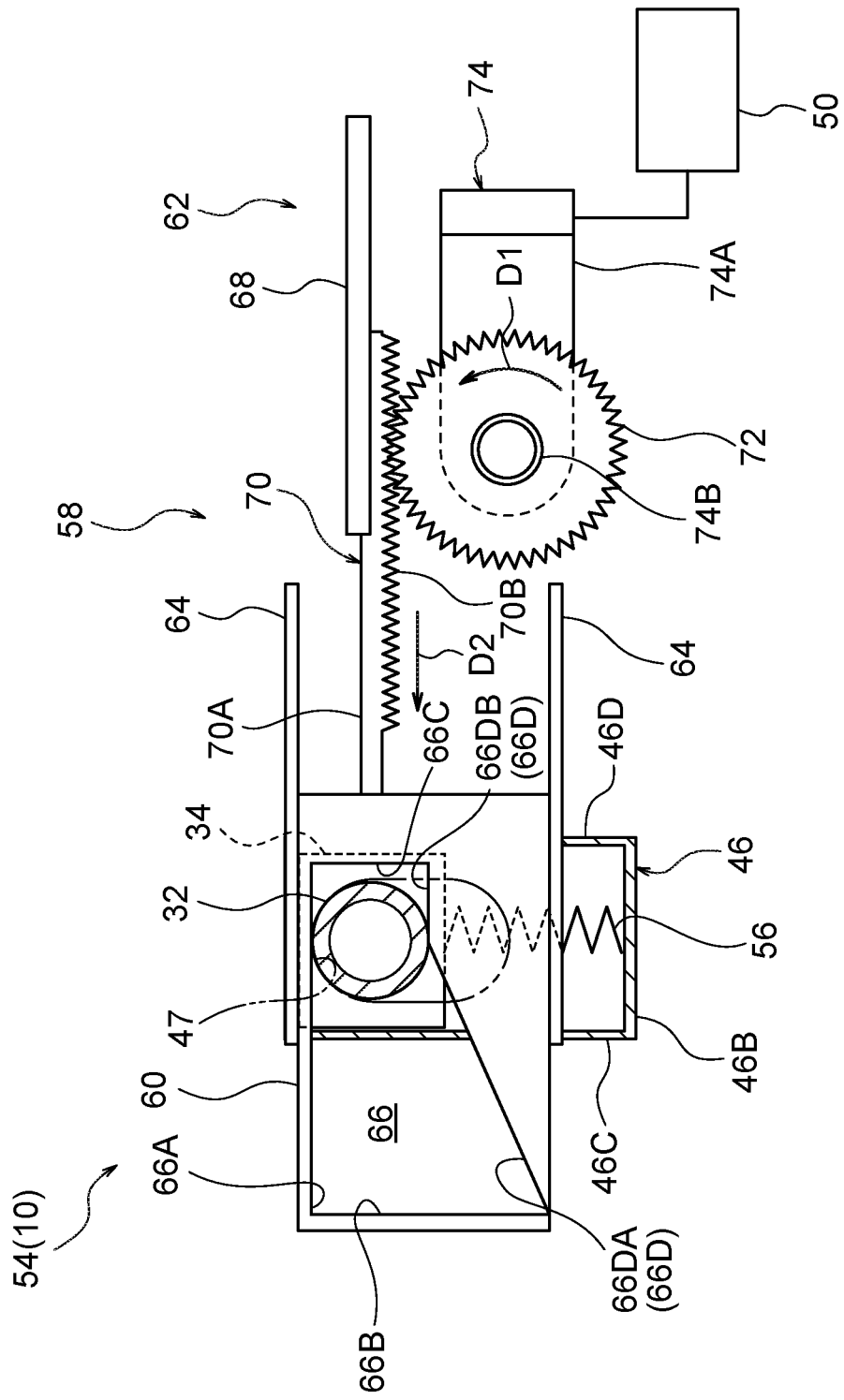
FIG. 7 is an enlarged sectional view that shows, in an enlarged manner, the vehicle occupant movement suppressing device that is a main portion of the vehicle seat relating to the second embodiment, and is a drawing showing a state in which a motor has operated.

Further, at the time of sudden braking or at the time when a collision is predicted, as shown in FIG. 7, the electric motors 74 are driven, the pinion gears 72 rotate counter-clockwise (arrow D1 in the drawing), and the rack gears 70 move toward the seat front side (arrow D2 in the drawing) along the rails 68. Accompanying the movement of the rack gears 70 toward the seat front side, the moving bodies 60 move toward the seat front side. Due thereto, the inclined portions 66DA, that structure the lower edges 66D of the through-holes 66 at the moving bodies 60, contact the waist movement suppressing member 32, and, accompanying the movement of the moving bodies 60, the inclined portions 66DA push-up (move) the waist movement suppressing member 32 toward the seat upper side along the guide holes 47. In this way, the submarine phenomenon can be suppressed.

Further, in the present embodiment, the ledge portions 66DB are formed continuously with the inclined portions 66DA. Therefore, in the state in which the waist movement suppressing member 32 has been moved toward the seat upper side, the waist movement suppressing member 32 is supported by the ledge portions 66DB, and movement of the waist movement suppressing member 32 toward the seat lower side is limited by the ledge portions 66DB.

Moreover, in the present embodiment, because there is a structure in which the waist movement suppressing member 32 is pushed-up by the inclined portions 66DA, by adjusting the angle of inclination of the inclined portions 66DA, the movement of the waist movement suppressing member 32 toward the seat upper side can be quickened or slowed. Other operations are similar to those of the first embodiment.

Still further, in the present embodiment, there is a structure in which the electric motor 74 is driven and the moving body 60 is moved toward the seat upper side. Therefore, in a case in which a collision is avoided in the state shown in FIG. 7, or the like, if the electric motor 74 is driven and the pinion gear 72 is rotated toward the opposite side, the moving body 60 can be moved toward the seat rear side. Due thereto, the moving body 60 can be returned to the state shown in FIG. 6. Namely, the electric motor 74 can also be used as a returning mechanism.

Note that, in the present embodiment, the inclined portion 66DA is formed in a linear shape, but the present disclosure is not limited to this, and the inclined portion may be made to be another shape. Further, for the actuator 62 as well, a different structure may be employed. For example, the structure of the modified example that is illustrated in FIG. 8 and FIG. 9 may be used.

Modified Example

Figure 8:
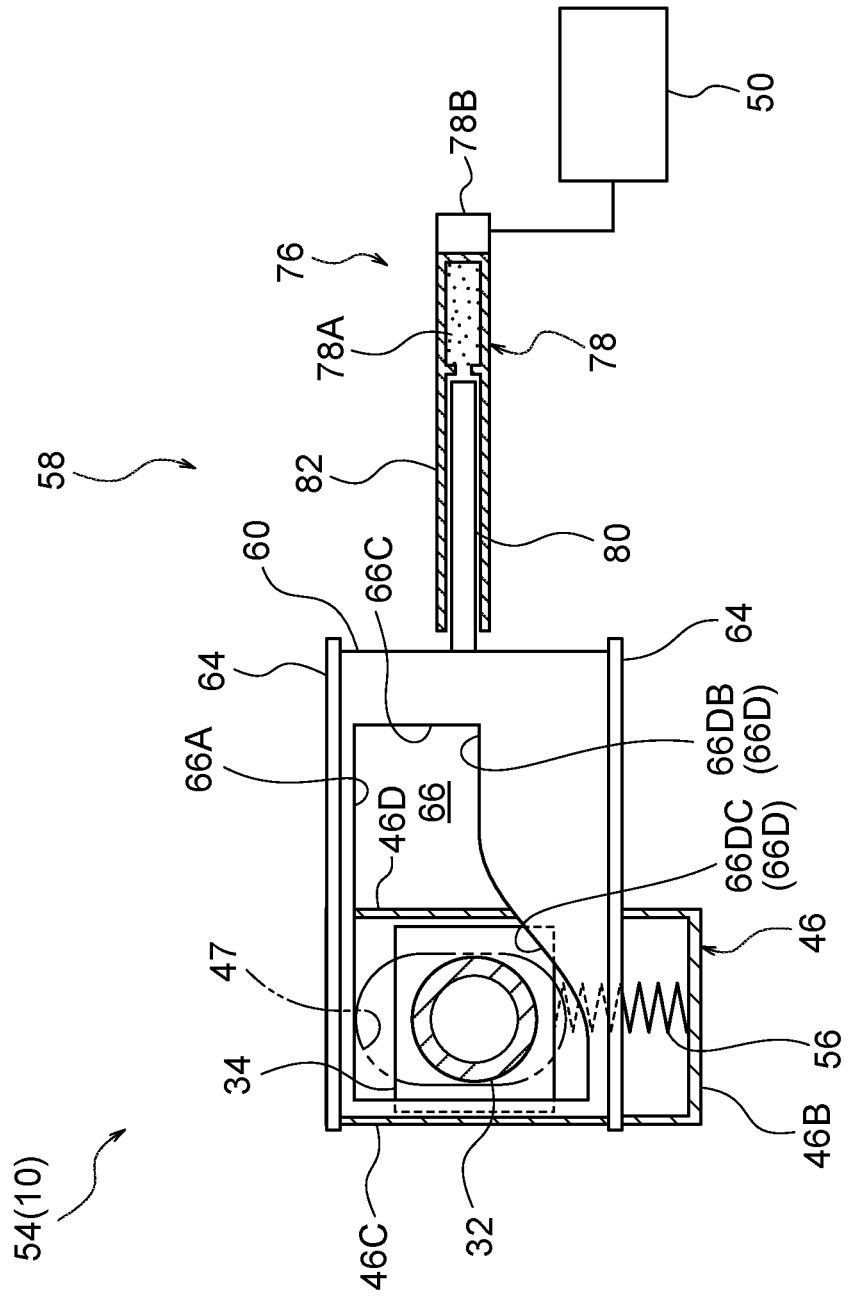
FIG. 8 is an enlarged sectional view that corresponds to FIG. 6 and shows a modified example of the vehicle seat relating to the second embodiment.
Figure 9:
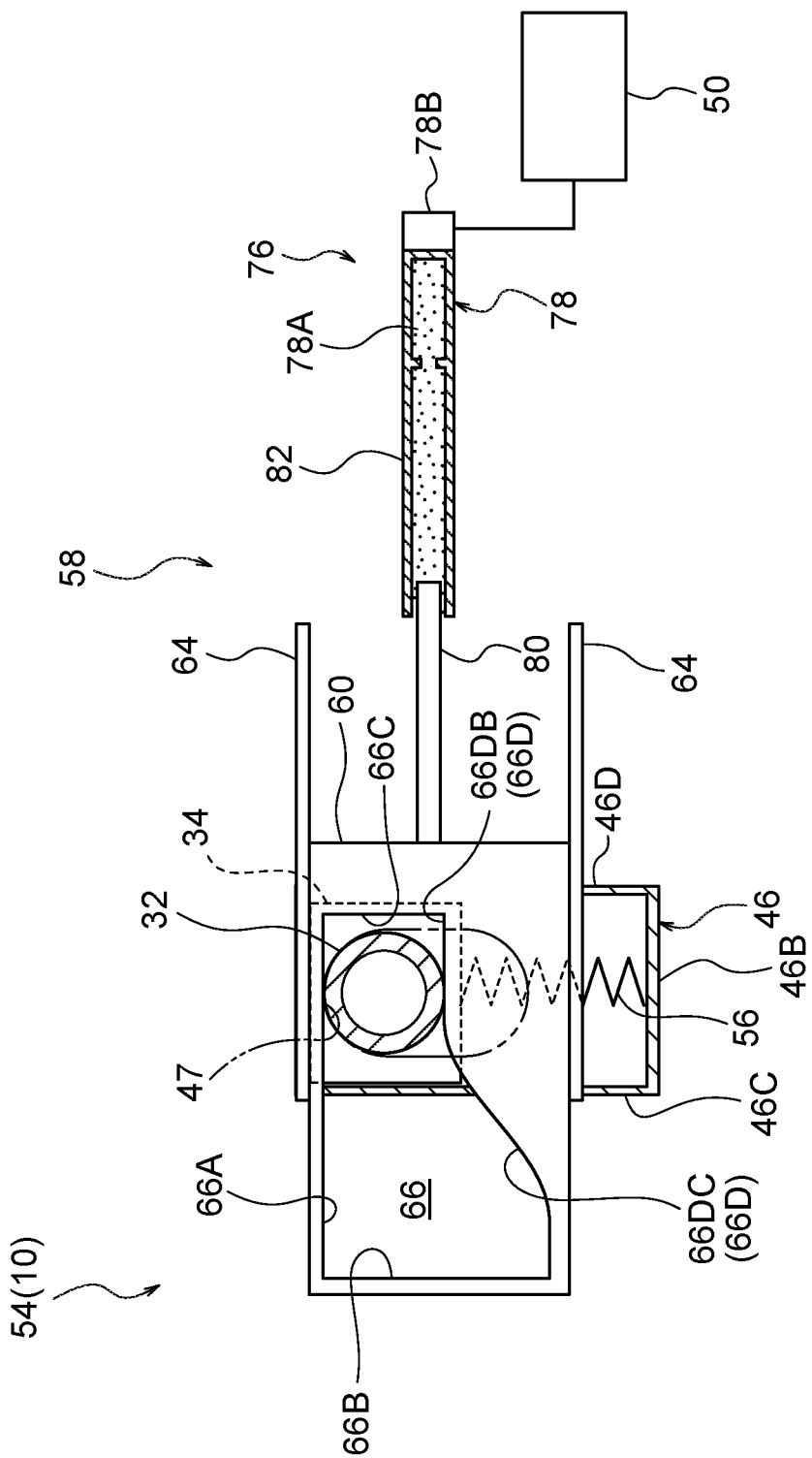
FIG. 9 is an enlarged sectional view that corresponds to FIG. 7 and shows the modified example of the vehicle seat relating to the second embodiment.

As shown in FIG. 8, in the present modified example, the shape of the lower edge 66D that structures the through-hole 66 of the moving body 60 is different. Concretely, the lower edge 66D of the through-hole 66 is structured to include an inclined portion 66DC and the ledge portion 66DB. The ledge portion 66DB is a shape that is similar to that in the first embodiment.

The inclined portion 66DC structures the seat front side of the lower edge 66D, and is inclined toward the seat upper side while heading from the front edge 66B toward the rear edge 66C. The lower end portion of the inclined portion 66DC is a curved shape that bulges toward the seat lower side. The boundary portion with the ledge portion 66DB at the upper end portion of the inclined portion 66DC is a curved shape that bulges toward the seat upper side. Namely, the inclined portion 66DC of the present modified example is, overall, a shape that is close to a cosine wave shape.

The rear end portion of the moving body 60 is connected to an actuator 76, and the actuator 76 is structured to include an inflator 78 and a rod 80. The inflator 78 is a so-called cylinder-type inflator, and is mounted to the side frame 22 (see FIG. 1) with the length direction thereof being the seat front-rear direction. Further, the inflator 78 is structured to include a gas generating portion 78A and an igniting portion 78B. The ECU 50 is electrically connected to the inflator 78. Moreover, a sensor that senses deceleration (deceleration G), a sensor that predicts a collision of the vehicle, and the like are electrically connected to the ECU 50. On the basis of signals from these sensors, the ECU 50 operates the inflator 78 at the time of sudden braking or at the time a collision is predicted.

The rod 80 is inserted within a pipe portion 82 that communicates with the gas generating portion 78A of the inflator 78, and can slide with respect to the tube portion 82. Therefore, at the time of sudden braking or at the time when a collision is predicted, as shown in FIG. 9, due to the inflator 78 operating, gas is generated from the gas generating portion 78A, and the gas flows into the pipe portion 82 interior and pushes the rod 80 out toward the seat front side. Due thereto, the moving body 60 is moved toward the seat front side.

At this time, because the lower end portions of the inclined portions 66DC are formed in curved shapes in the present modified example, immediately after the start of movement of the moving bodies 60, the waist movement suppressing member 32 moves gradually toward the seat upper side. Due thereto, as compared with the structure of FIG. 6 in which the lower end portions of the inclined portions 66DA are linear, the speed in the initial stage of movement in which the waist movement suppressing member 32 moves toward the seat upper side can be reduced, and the load to the vehicle occupant P can be reduced easily.

Third Embodiment

A third embodiment of the present disclosure is described next with reference to FIG. 10 through FIG. 12. Note that structures and operations that are basically similar to those of the other embodiments are denoted by the same reference numerals as in the other embodiments, and description thereof is omitted as appropriate.

Figure 10:
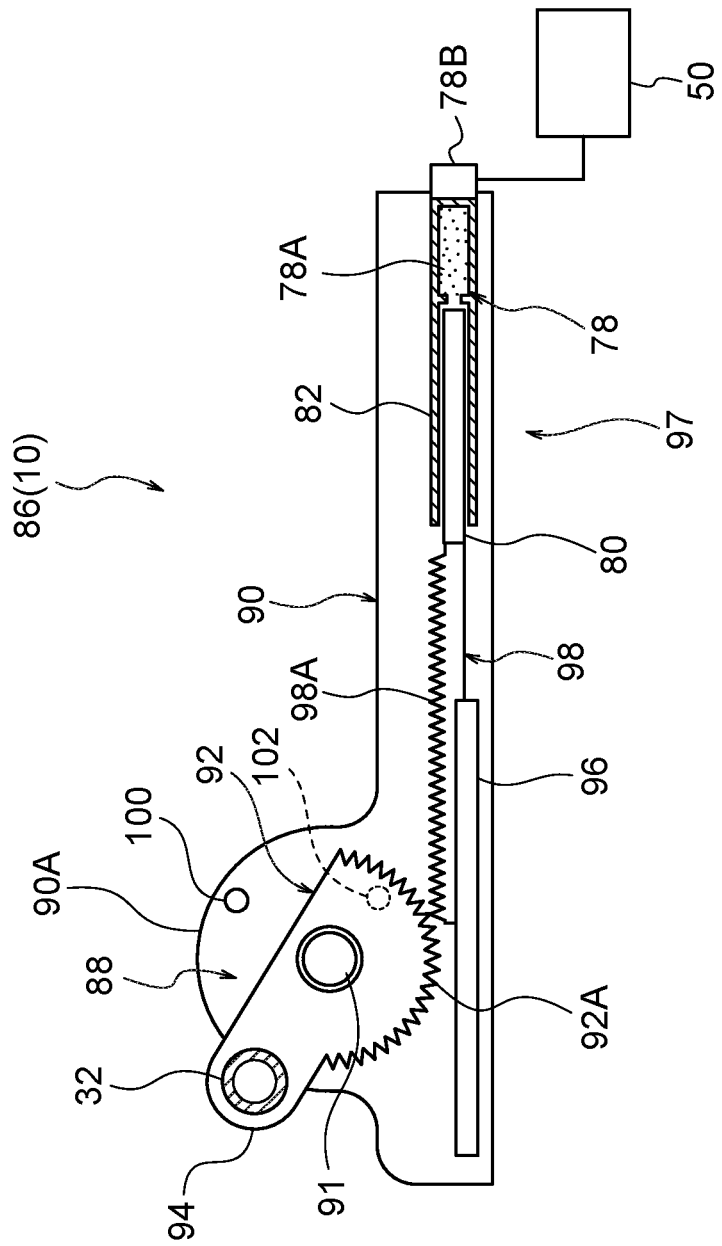
FIG. 10 is an enlarged sectional view that shows, in an enlarged manner, a vehicle occupant movement suppressing device that is a main portion of a vehicle seat relating to a third embodiment, and is a drawing showing a state before a vehicle occupant sits in the vehicle seat.

As shown in FIG. 10, a vehicle occupant movement suppressing device 86 that is provided at the vehicle seat 10 relating to the present embodiment has the waist movement suppressing member 32 that is similar to that of the first embodiment. Here, the both end portions of the waist movement suppressing member 32 are connected to rotating members 88 that serve as movable members, and the rotating members 88 are rotatably mounted to shaft bodies 91 that are provided at housings 90. In other words, the both end portions of the waist movement suppressing member 32 are supported by the rotating members 88 so as to be able to move in the seat vertical direction.

The shaft body 91 is urged clockwise by an unillustrated torsion spring that serves as an urging member. Namely, the waist movement suppressing member 32 is urged in a direction of moving toward the seat upper side.

The housing 90 is fixed to the side frame 22 (see FIG. 1), and is formed in an elongated shape with the length direction thereof being the seat front-rear direction. An expanded portion 90A, that is substantially semicircular and is expanded toward the seat upper side, is provided at the front portion of the housing 90. The shaft body 91 is provided at the expanded portion 90A so as to project-out. The rotating member 88 is rotatably mounted to the shaft body 91. In the present embodiment, as an example, an unillustrated bearing is provided between the shaft body 91 and the rotating member 88.

The rotating member 88 is structured to include a main body portion 92 and a projecting portion 94. The main body portion 92 is formed in a substantially semicircular shape as seen in a side view. A gear portion 92A is formed at the peripheral edge portion of the arc shape and is structured to function as a pinion gear. Further, the projecting portion 94 projects-out toward the seat front side and the seat upper side from the main body portion 92. An end portion of the waist movement suppressing member 32 is connected to the projecting portion 94. Due thereto, due to the rotating members 88 rotating around the shaft bodies 91 that serve as rotation shafts, the waist movement suppressing member 32 moves in the seat vertical direction.

A rail 96, an actuator 97 that serves as a raising mechanism, a first protrusion 100, and a second protrusion 102 that serves as a stopper are mounted to the housing 90. The rail 96 is disposed at the seat lower side of the rotating member 88 and extends in the seat front-rear direction. A rack gear 98 that is described later is slidably mounted to the rail 96.

The actuator 97 is structured to include the inflator 78 and the rod 80. In the same way as in the modified example illustrated in FIG. 8, the inflator 78 has the gas generating portion 78A and the igniting portion 78B, and the rod 80 is inserted within the pipe portion 82 that communicates with the gas generating portion 78A of the inflator 78. Further, the inflator 78 is electrically connected to the ECU 50. A sensor that senses deceleration (deceleration G), a sensor that predicts a collision of the vehicle, and the like are electrically connected to the ECU 50. On the basis of signals from these sensors, the ECU 50 operates the inflator 78 at the time of sudden braking or at the time a collision is predicted.

The rack gear 98 is mounted to the front end portion of the rod 80. The rack gear 98 extends from the front end portion of the rod 80 toward the seat front side with the length direction thereof being the seat front-rear direction. A gear portion 98A is formed at the top surface of the rack gear 98. The gear portion 98A meshes-together with the gear portion 92A of the rotating member 88. Note that, in the state shown in FIG. 10 which is the usual state before the vehicle occupant movement suppressing device 86 operates, the gear portion 92A of the rotating member 88 and the gear portion 98A of the rack gear 98 are not meshed-together, and the rotating member 88 can rotate freely.

The first protrusion 100 projects-out toward the seat width direction inner side from the upper end portion of the expanded portion 90A at the housing 90, and is provided on the locus of rotation of the rotating member 88. Therefore, as shown in FIG. 11 and FIG. 12, the rotating member 88 is anchored due to the rotating member 88 rotating and abutting the first protrusion 100.

As shown in FIG. 10, the second protrusion 102 is provided further toward the seat lower side than the first protrusion 100. The second protrusion 102 is inserted-through an unillustrated insert-through hole that is formed in the housing 90, and is urged toward the rotating member 88 side (the seat width direction inner side) by an unillustrated urging means. Namely, the second protrusion 102 is in a state of being pushed-against the rotating member 88. The position of the second protrusion 102 in this state is a non-anchoring position at which the first protrusion 100 does not overlap the rotating member 88 as seen from the seat front-rear direction.

On the other hand, as shown in FIG. 12, when the rotating member 88 rotates clockwise and the second protrusion 102 is exposed, the second protrusion 102 is moved toward the seat width direction inner side by the urging force from the unillustrated urging means, and is positioned on the locus of rotation of the rotating member 88. Namely, the position of the second protrusion 102 in this state is an anchoring position at which the second protrusion 102 overlaps the rotating member 88 as seen from the seat front-rear direction.

(Operation and Effects)

Operation and effects of the present embodiment are described next.

In the vehicle seat 10 of the present embodiment, as shown in FIG. 10, in the state before a vehicle occupant sits, the waist movement suppressing member 32 is positioned at a seat obliquely front and upper side with respect to the shaft bodies 91. Here, when the vehicle occupant P (see FIG. 4) sits in the vehicle seat 10, as shown in FIG. 11, the rotating members 88 rotate counterclockwise against the urging forces of the torsion springs, and the waist movement suppressing member 32 moves toward the seat lower side. Further, due to the rotating members 88 rotating around the shaft bodies 91 due to vibrations at the time of traveling, the waist movement suppressing member 32 moves up and down. Due thereto, even though the waist movement suppressing member 32 is disposed at the seat upper side, the comfort of the ride of the vehicle occupant P need not deteriorate. Note that the two-dot chain line in the drawing indicates the position of the waist movement suppressing member 32 in the state before the vehicle occupant P sits. Further, in FIG. 11, although the main body portion 92 of the rotating member 88 is abutting the first protrusion 100, there may be a structure in which the rotating member 88 is rotated in a range in which the main body portion 92 does not abut the first protrusion 100.

At a time of sudden braking or at a time when a collision is predicted, as shown in FIG. 12, due to the inflators 78 of the actuators 97 operating, gas is generated from the gas generating portions 78A, and flows into the pipe portions 82, and pushes the rods 80 out toward the seat front side. Due thereto, the rack gears 98 move toward the seat front side (arrow D3 in the drawing) along the rails 96 and mesh-together with the gear portions 92A of the rotating members 88, and rotate the rotating members 88 clockwise (arrow D4 in the drawing). Further, the rotating members 88 rotate until anchored on the first protrusions 100, and move the waist movement suppressing member 32 toward the seat upper side. In this way, the submarine phenomenon can be suppressed.

Further, in the state shown in FIG. 12, the second protrusions 102 are moved toward the seat width direction inner side to the anchoring positions. Therefore, both clockwise and counterclockwise rotation of the rotating members 88 are limited. Due thereto, movement of the waist movement suppressing member 32 toward the seat lower side is limited. In this way, rotation of the rotating members 88 can be locked by a simple structure.

Moreover, as in the present embodiment, there is a structure in which the waist movement suppressing member 32 is moved in the seat vertical direction due to the rotating members 88 being rotated. Therefore, the height of the waist movement suppressing member 32 can easily be changed merely by adjusting the angle of rotation of the rotating members 88. Other operations are similar to those of the first embodiment.

Fourth Embodiment

A fourth embodiment of the present disclosure is described next with reference to FIG. 13A through FIG. 15B. Note that structures and operations that are basically similar to those of the first embodiment are denoted by the same reference numerals as in the first embodiment, and description thereof is omitted as appropriate.

Figure 13A:
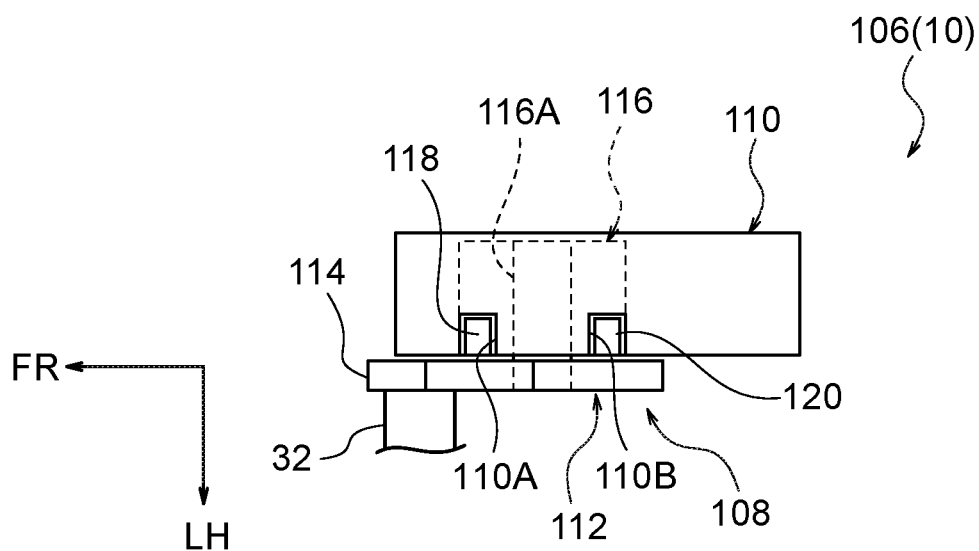
FIG. 13A is an enlarged view that shows, in an enlarged manner, a vehicle occupant movement suppressing device that is a main portion of a vehicle seat relating to a fourth embodiment, and is a plan view of a state before a vehicle occupant sits in the vehicle seat.
Figure 13B:
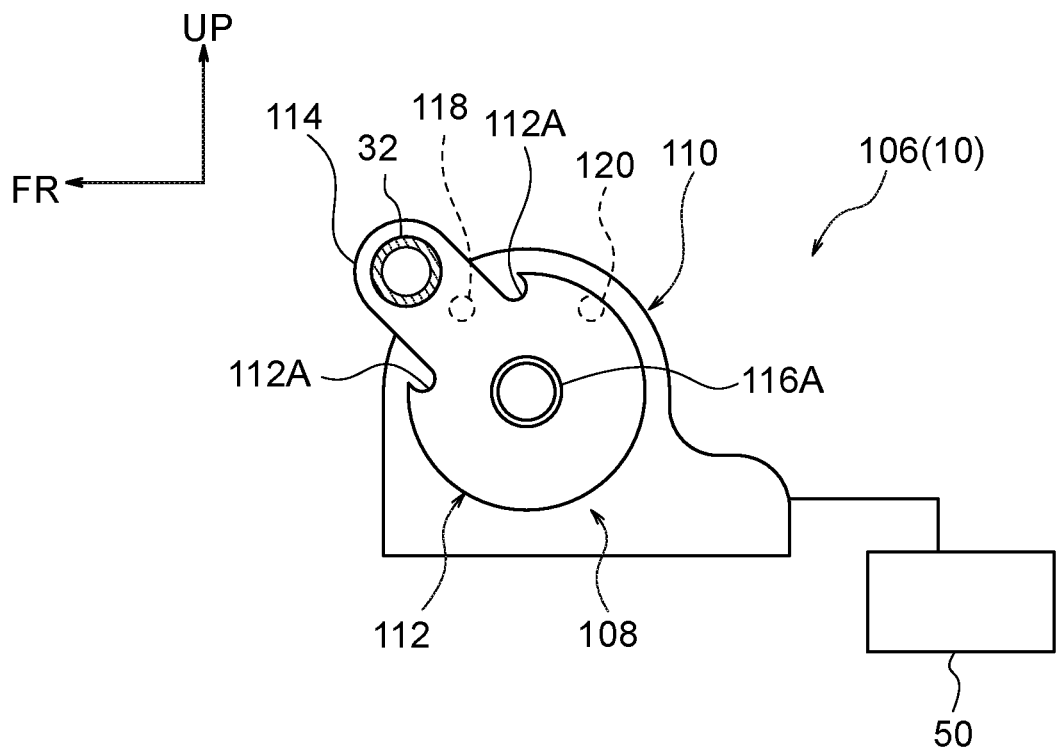
FIG. 13B is an enlarged view that shows, in an enlarged manner, the vehicle occupant movement suppressing device that is a main portion of the vehicle seat relating to the fourth embodiment, and is a side view.

As shown in FIG. 13A and FIG. 13B, a vehicle occupant movement suppressing device 106 that is provided at the vehicle seat 10 relating to the present embodiment has the waist movement suppressing member 32 that is similar to that of the first embodiment. Here, the both end portions of the waist movement suppressing member 32 are connected to rotating members 108 that serve as movable members. The rotating member 108 is mounted to a motor shaft 116A that serves as a rotation shaft and is described later and projects-out from a housing 110.

The rotating member 108 is structured to include a main body portion 112 and a projecting portion 114. The main body portion 112 is formed in a substantially circular shape as seen in a side view. The projecting portion 114 projects-out toward the seat front side and the seat upper side from the main body portion 112. The waist movement suppressing member 32 is connected to the projecting portion 114. Further, a pair of concave portions 112A are formed at the base portion of the projecting portion 114 at the main body portion 112, with the projecting portion 114 interposed therebetween.

The housing 110 is provided at the seat width direction outer side (the seat right side) of the rotating member 108, and is fixed to the side frame 22 (see FIG. 1). The housing 110 is formed in the shape of a box that is substantially rectangular as seen in a plan view. The upper portion of the housing 110 is formed in a substantially circular shape that is one size larger than the rotating member 108 as seen in a side view. Here, an electric motor 116 that serves as a raising mechanism is disposed at the interior of the housing 110.

The electric motor 116 is an actuator that has the motor shaft 116A whose axial direction is the seat width direction. The distal end of the motor shaft 116A projects-out toward the seat width direction inner side (the seat left side) from the housing 110. The rotating member 108 is mounted to the distal end of the motor shaft 116A. Therefore, due to the electric motor 116 being energized and driven, the motor shaft 116A rotates, and the rotating member 108 rotates around the motor shaft 116A. Accompanying the rotation of the rotating member 108, the waist movement suppressing member 32 is moved in the vertical direction. Namely, the rotating member 108 supports the waist movement suppressing member 32 so as to be movable in the seat vertical direction.

The motor shaft 116A is urged clockwise by an unillustrated torsion spring that serves as an urging member. Namely, the waist movement suppressing member 32 is urged in a direction of moving toward the seat upper side.

Stopper accommodating portions 110A, 110B are formed in the housing 110. The stopper accommodating portions 110A, 110B are respectively formed by indenting the rotating member 108 side (the seat left side) surface of the housing 110 toward the seat right side. A first stopper 118 that is substantially solid cylindrical is accommodated in the stopper accommodating portion 110A, and a second stopper 120 that is substantially solid cylindrical is accommodated in the stopper accommodating portion 110B.

Figure 15A:
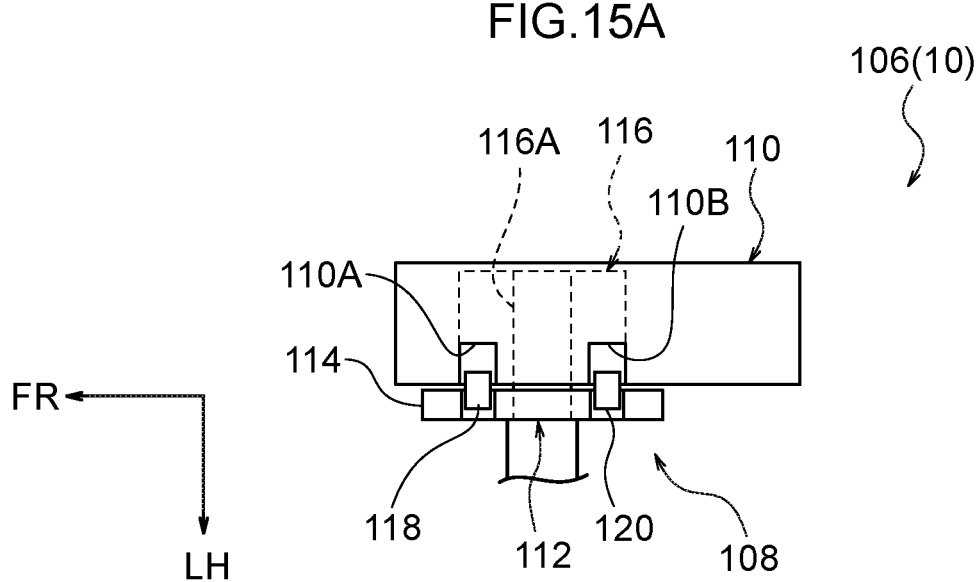
FIG. 15A is an enlarged view that shows, in an enlarged manner, the vehicle occupant movement suppressing device that is a main portion of the vehicle seat relating to the fourth embodiment, and is a plan view of a state in which an inflator has operated.

The first stopper 118 and the second stopper 120 are disposed on the locus of rotation of the outer peripheral end portion of the rotating member 108, and are disposed at substantially the same height. The first stopper 118 is positioned further toward the seat front side. Here, the first stopper 118 and the second stopper 120 are respectively structured so as to be movable in the seat width direction, and can move alternately between non-anchoring positions at which they do not overlap the rotating member 108 as seen from the seat front-rear direction and as shown in FIG. 13A, and anchoring positions at which they overlap the rotating member 108 as seen from the seat front-rear direction and as shown in FIG. 15A. Note that a solenoid or the like can be used as an example of the means for moving the first stopper 118 and the second stopper 120.

The electric motor 116 is electrically connected to the ECU 50. A sensor that senses deceleration (deceleration G), a sensor that predicts a collision of the vehicle, and the like are electrically connected to the ECU 50. On the basis of signals from these sensors, the ECU 50 energizes and drives the electric motor 116 at the time of sudden braking or at the time a collision is predicted. Due to the electric motor 116 being driven, the rotating member 108 rotates clockwise together with the motor shaft 116A, and the waist movement suppressing member 32 moves toward the seat upper side. Further, it is also possible for the electric motor 116 to be driven and the rotating member 108 to rotate counterclockwise together with the motor shaft 116A. Therefore, the electric motor 116 also functions as a returning mechanism that moves the waist movement suppressing member 32, which has been moved toward the seat upper side, toward the seat lower side again.

(Operation and Effects)

Operation and effects of the present embodiment are described next.

Figure 14A:
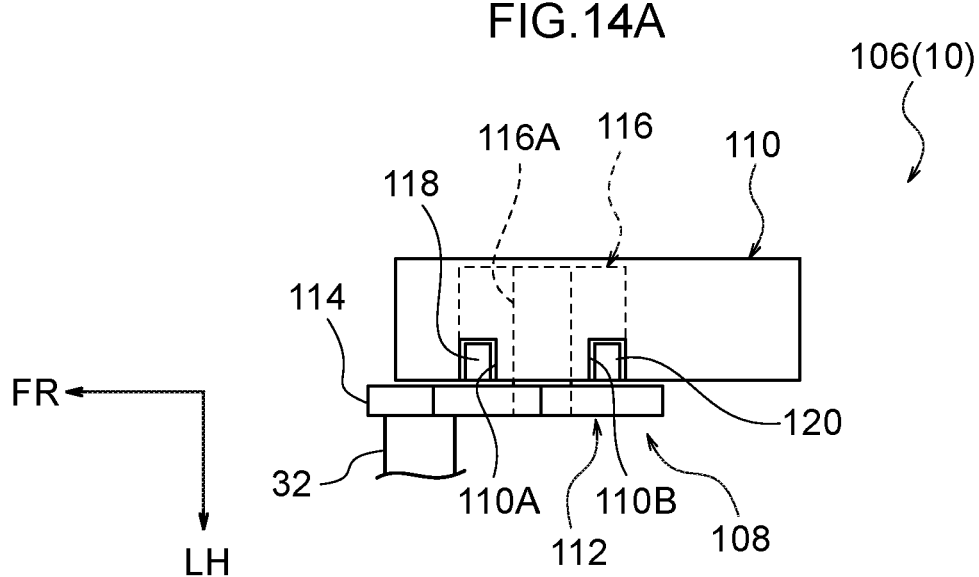
FIG. 14A is an enlarged view that shows, in an enlarged manner, the vehicle occupant movement suppressing device that is a main portion of the vehicle seat relating to the fourth embodiment, and is a plan view of a state in which a vehicle occupant is seated in the vehicle seat.
Figure 14B:
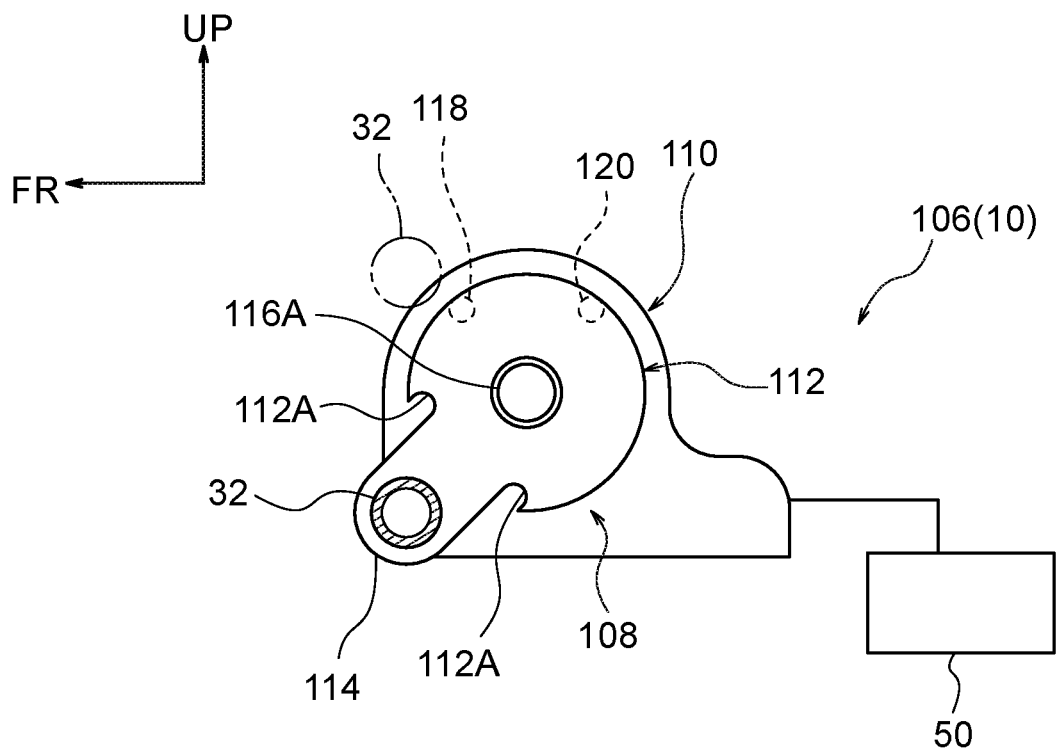
FIG. 14B is an enlarged view that shows, in an enlarged manner, the vehicle occupant movement suppressing device that is a main portion of the vehicle seat relating to the fourth embodiment, and is a side view.

In the vehicle seat 10 of the present embodiment, as shown in FIG. 13B, in the state before the vehicle occupant sits, the waist movement suppressing member 32 is positioned at a seat obliquely front and upper side with respect to the motor shafts 116A. Here, when the vehicle occupant P (see FIG. 4) sits in the vehicle seat 10, as shown in FIG. 14B, the rotating members 108 rotate counterclockwise against the urging forces of the torsion springs, and the waist movement suppressing member 32 moves toward the seat lower side. Further, due to the rotating members 108 rotating around the motor shafts 116A due to vibrations at the time of traveling, the waist movement suppressing member 32 moves up and down. Due thereto, even though the waist movement suppressing member 32 is disposed at the seat upper side, the comfort of the ride of the vehicle occupant P need not deteriorate. Note that the two-dot chain line in FIG. 14B shows the position of the waist movement suppressing member 32 in the state before the vehicle occupant P sits. Further, as shown in FIG. 14A, the first stopper 118 and the second stopper 120 are maintained at the non-anchoring positions, in the same way as in FIG. 13A.

Figure 15B:
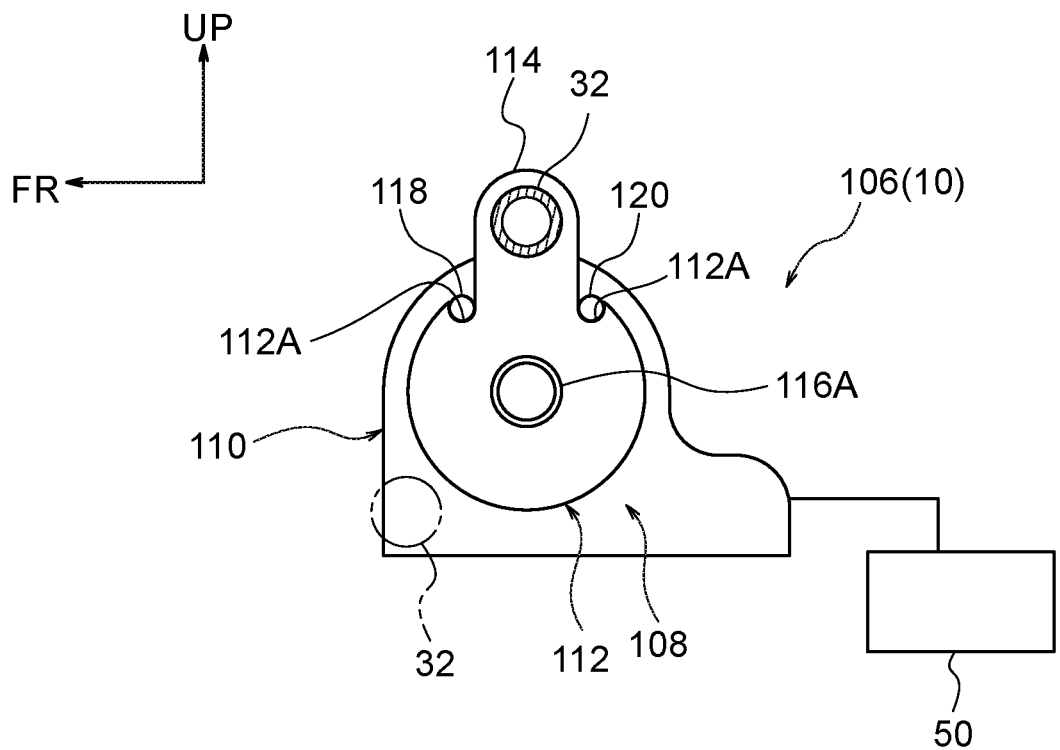
FIG. 15B is an enlarged view that shows, in an enlarged manner, the vehicle occupant movement suppressing device that is a main portion of the vehicle seat relating to the fourth embodiment, and is a side view.

At the time of sudden braking or at the time when a collision is predicted, as shown in FIG. 15B, the electric motors 116 are driven, and the motor shafts 116A are rotated clockwise. Further, the rotating members 108 rotate clockwise together with the motor shafts 116A, and the waist movement suppressing member 32 is moved toward the seat upper side. In this way, the submarine phenomenon can be suppressed. Note that the two-dot chain line in FIG. 15B shows the position of the waist movement suppressing member 32 in the seated state of FIG. 14B.

Further, as shown in FIG. 15A, in the state in which the waist movement suppressing member 32 has moved toward the seat upper side, the first stoppers 118 and the second stoppers 120 move in the seat width direction from the non-anchoring positions to the anchoring positions, and enter into the pairs of concave portions 112A. Therefore, rotation of the rotating members 108 is limited in both the clockwise and counterclockwise directions. Due thereto, movement of the waist movement suppressing member 32 toward the seat lower side is limited. In this way, rotation of the rotating members 108 can be locked by a simple structure.

Moreover, in the present embodiment, in a case in which a collision is avoided or the like, the first stoppers 118 and the second stoppers 120 move in the seat width direction from the anchoring positions to the non-anchoring positions, and are accommodated in the stopper accommodating portions 110A, 110B. Thereafter, the motor shafts 116A rotate counterclockwise, and the waist movement suppressing member 32 is moved toward the seat lower side. In this way, the waist movement suppressing member 32 can be returned to its original position. Other operations are similar to those of the first embodiment.

Although vehicle seats relating to a first embodiment through a fourth embodiment have been described above, the present disclosure can, of course, be implemented in various forms within a scope that does not depart from the gist thereof. For example, in the third embodiment and the fourth embodiment, a torsion spring is used as the urging member. However, the present disclosure is not limited to this, and may be a structure that does not have a torsion spring. As shown in FIG. 1, the waist movement suppressing member 32 passes-through seat cushion pad 18. Therefore, if the waist movement suppressing member 32 is adhered (joined) to the seat cushion pad 18, the waist movement suppressing member 32 can be urged toward the seat upper side by the restoring force of the seat cushion pad 18. Namely, this is a structure in which the seat cushion pad 18 functions as the urging member.

Further, in the first embodiment, the raising mechanism is structured to include the inflator 44 as shown in FIG. 2, and, in the second embodiment, the raising mechanism is structured to include the electric motor 74 as shown in FIG. 6. However, the present disclosure is not limited to this. For example, in the first embodiment, a raising mechanism that is provided with a motor instead of the inflator 44 may be employed. In this case, in the structure that is shown in FIG. 2, the plate-shaped member 42 may be structured so as to be raised and lowered by a ball screw, and the ball screw may be rotated by the motor. In the other embodiments as well, the type of the actuator is not particularly limited.

Moreover, in the second embodiment, as shown in FIG. 6, the waist movement suppressing member 32 is pushed-up toward the seat upper side due to the moving body 60 being moved toward the seat front side. However, the present disclosure is not limited to this. For example, there may be a structure in which the waist movement suppressing member 32 is moved toward the seat upper side due to the moving bodies 60 being moved toward the seat rear side. In this case, it suffices to reverse, left and right, the lower edge 66D of the through-hole 66 that is formed in the moving body 60. Namely, if the inclined portion 66DA is inclined in the direction opposite to that in FIG. 6, and the ledge portion 66DB is formed at the seat front side of the lower edge 66D, operations that are similar to those of the second embodiment can be obtained.

What is claimed is:

1. A vehicle seat comprising:
    a waist movement suppressing member that is disposed at a seat front side and a seat upper side of a seat cushion, and that extends in a seat width direction;
    movable members that movably support both end portions of the waist movement suppressing member in a seat vertical direction;
    urging members that urge the movable members toward a seat upper side;
    raising mechanisms that, at a time of sudden braking or at a time a collision is predicted, move the waist movement suppressing member toward the seat upper side; and
    stoppers that limit movement, toward a seat lower side, of the waist movement suppressing member that has been moved toward the seat upper side by the raising mechanisms.

2. The vehicle seat of claim 1, wherein:
    each movable member is provided within a case so as to be movable in the seat vertical direction; and
    each raising mechanism is structured to include a plate-shaped member that is disposed within the case further toward the seat lower side than its corresponding movable member, and an actuator that moves the plate-shaped member toward the seat upper side.

3. The vehicle seat of claim 2, wherein:

each stopper is structured to include a projection that is provided at an inner wall of the case so as to project-out; and the projection is configured to support the plate-shaped member that has moved toward the seat upper side, and a seat lower side surface of the projection is an inclined surface that, from a distal end side to a base side, is inclined toward the seat lower side.

4. The vehicle seat of claim 1, wherein:

each raising mechanism is structured to include a moving body that is provided so as to be movable in a seat front-rear direction, and an actuator that moves the moving body; and an inclined portion, which supports the waist movement suppressing member from the seat lower side and moves the waist movement suppressing member in the seat vertical direction accompanying movement of the moving body, is formed at the moving body.

5. The vehicle seat of claim 4, wherein each stopper is structured to include a ledge portion that is horizontal, that is formed at an upper end of the inclined portion, and that is continuous with the inclined portion.

6. The vehicle seat of claim 4, wherein a lower end portion of the inclined portion is a curved shaped that bulges-out toward the seat lower side.

7. The vehicle seat of claim 1, wherein:

each movable member is structured to include a rotating member that is configured to rotate around a rotation shaft whose axial direction is a seat width direction; and each raising mechanism is structured to include an actuator that, by rotating the rotating member, moves the waist movement suppressing member toward the seat upper side.

8. The vehicle seat of claim 7, wherein:

the actuator is structured to include an electric motor;

a motor shaft of the electric motor is connected to the rotating member; and due to the electric motor being driven, the rotating member is rotated and the waist movement suppressing member is moved toward the seat upper side.

9. The vehicle seat of claim 7, wherein:

each stopper is provided so as to be movable in a seat width direction from a non-anchoring position, at which the stopper does not overlap the rotating member as seen from a seat front-rear direction, to an anchoring position, at which the stopper overlaps the rotating member as seen from the seat front-rear direction; and in a state in which the waist movement suppressing member is moved toward the seat upper side by the actuator, the stopper moves to the anchoring position and limits rotation of the rotating member.

10. The vehicle seat of claim 1, further comprising a returning mechanism that moves the waist movement suppressing member, that has been moved toward the seat upper side, toward the seat lower side again.

* * * * *